United States Patent
Shimizu et al.

(10) Patent No.: US 11,907,434 B2
(45) Date of Patent: Feb. 20, 2024

(54) INFORMATION PROCESSING APPARATUS, INFORMATION PROCESSING SYSTEM, AND INFORMATION PROCESSING METHOD

(71) Applicant: SONY GROUP CORPORATION, Tokyo (JP)

(72) Inventors: Takayoshi Shimizu, Chiba (JP); Kazuma Takahashi, Chiba (JP)

(73) Assignee: SONY GROUP CORPORATION, Tokyo (JP)

( * ) Notice: Subject to any disclaimer, the term of this patent is extended or adjusted under 35 U.S.C. 154(b) by 54 days.

(21) Appl. No.: 17/790,413

(22) PCT Filed: Jan. 21, 2021

(86) PCT No.: PCT/JP2021/002042
§ 371 (c)(1),
(2) Date: Jun. 30, 2022

(87) PCT Pub. No.: WO2021/153413
PCT Pub. Date: Aug. 5, 2021

(65) Prior Publication Data
US 2023/0071828 A1    Mar. 9, 2023

(30) Foreign Application Priority Data
Jan. 29, 2020  (JP) .................................. 2020-012995

(51) Int. Cl.
*G06F 3/01*          (2006.01)
(52) U.S. Cl.
CPC .............. *G06F 3/017* (2013.01); *G06F 3/011* (2013.01)

(58) Field of Classification Search
CPC .......... G06F 3/017; G06F 3/011; G06F 3/016; G06F 3/0481; G06F 3/0482; H04N 13/243; H04N 13/344
See application file for complete search history.

(56) References Cited

U.S. PATENT DOCUMENTS

| 2006/0168523 A1* | 7/2006 | Yoda | G06T 7/97 |
| | | | 715/728 |
| 2014/0125584 A1* | 5/2014 | Xun | G06F 3/011 |
| | | | 345/156 |

(Continued)

FOREIGN PATENT DOCUMENTS

| EP | 2846308 A2 | 3/2015 |
| JP | 2009-037434 A | 2/2009 |

(Continued)

OTHER PUBLICATIONS

Bunnun et al., OutlinAR: an assisted interactive model building system with reduced computational effort, 2008 7$^{th}$ IEEE/ACM International Symposium on Mixed and Augmented Reality, Sep. 15-18, 2008, pp. 1-3, IEEE, Cambridge, UK.

(Continued)

*Primary Examiner* — Hong Zhou
(74) *Attorney, Agent, or Firm* — Paratus Law Group, PLLC

(57) ABSTRACT

To provide an information processing apparatus (100) including: a detection unit (110) that detects an object selected by a user with a finger-pointing gesture as a selected object, in which the detection unit detects the selected object on the basis of a first extension line extending from a first line segment connecting a first reference point indicating a position of a wrist of a hand of the user corresponding to the finger-pointing gesture and a second reference point corresponding to a height of the wrist on a first perpendicular line (Continued)

perpendicularly extending from a base of an arm of the user corresponding to the finger-pointing gesture to a floor surface toward a wrist side.

20 Claims, 28 Drawing Sheets

(56) References Cited

U.S. PATENT DOCUMENTS

| | | | | |
|---|---|---|---|---|
| 2015/0062010 A1* | 3/2015 | Lin | ........................ | G06F 3/017 |
| | | | | 345/157 |
| 2015/0177846 A1* | 6/2015 | Yin | ..................... | G06V 10/7557 |
| | | | | 382/103 |
| 2015/0193005 A1* | 7/2015 | Di Censo | ................ | G10L 17/22 |
| | | | | 345/156 |
| 2015/0309681 A1* | 10/2015 | Plagemann | ........... | G06F 3/0304 |
| | | | | 715/863 |
| 2018/0059811 A1* | 3/2018 | Suzuki | ................. | G06F 3/0485 |
| 2018/0173318 A1* | 6/2018 | Kim | ........................ | G06V 40/28 |
| 2021/0090331 A1* | 3/2021 | Ravasz | ................... | G06F 3/017 |

FOREIGN PATENT DOCUMENTS

| | | |
|---|---|---|
| JP | 2016-184203 A | 10/2016 |
| JP | 2017041187 A | 2/2017 |
| JP | 2017-090615 A | 5/2017 |

OTHER PUBLICATIONS

Yata, Natural Interface of Personal Intelligent Vehicles by Hand Gesture Recognition, Lecture proceedings (4) of the 75$^{th}$ (2013) national conference of interface computer and human society, Mar. 6, 2013, pp. 4-101 to 4-102 (see International Search Report below for concise relevance).

Apr. 20, 2021, International Search Report issued for related PCT application No. PCT/JP2021/002042.

* cited by examiner

INFORMATION PROCESSING APPARATUS, INFORMATION PROCESSING SYSTEM, AND INFORMATION PROCESSING METHOD

CROSS REFERENCE TO PRIOR APPLICATION

This application is a National Stage Patent Application of PCT International Patent Application No. PCT/JP2021/002042 (filed on Jan. 21, 2021) under 35 U.S.C. § 371, which claims priority to Japanese Patent Application No. 2020-012995 (filed on Jan. 29, 2020), which are all hereby incorporated by reference in their entirety.

FIELD

The present disclosure relates to an information processing apparatus, an information processing system, and an information processing method.

BACKGROUND

There is a content providing method in which an image of a person (user) such as an artist is captured from multiple viewpoints, a plurality of captured images is stereoscopically combined to generate a live-action volumetric (stereoscopic video), and a large number of viewers is allowed to view the live-action volumetric projected or displayed at a remote place away from the person. Then, in such a content providing method, in order to make the experience created by the provision of the content better, it is required to provide the viewer with an interactive experience in which the artist and the viewer feel as if they are in the same space and directly interact with each other.

For example, as an example of the interactive experience, there is an interaction between an artist and a viewer (selected object) selected by the artist via a system (information processing system). In such a case, for example, the system senses, with a sensor, a selection motion in which the artist selects a viewer with which to interact, and detects the selected viewer on the basis of sensing data by the sensor. Then, the above-described system communicably connects a selected viewer-side device and an artist-side device to form a channel for interaction.

CITATION LIST

Non Patent Literature

Non Patent Literature 1: OutlinAR: an assisted interactive model building system with reduced computational effort, Pished Bunnun, Walterio W. Mayol-Cuevas, 2008, 7th IEEE/ACM International Symposium on Mixed and Augmented Reality, IEEE

SUMMARY

Technical Problem

However, in a system (information processing system) that has been studied so far, it is difficult to accurately detect a viewer (object) selected by an artist (user), or the artist is required to perform an unnatural motion as a selection motion.

Therefore, the present disclosure proposes an information processing apparatus, an information processing system, and an information processing method capable of accurately selecting an object selected by a natural and intuitive selection motion by a user.

Solution to Problem

According to the present disclosure, an information processing apparatus is provided. The information processing apparatus includes a detection unit that detects an object selected by a user with a finger-pointing gesture as a selected object. The detection unit detects the selected object on a basis of a first extension line extending from a first line segment connecting a first reference point indicating a position of a wrist of a hand of the user corresponding to the finger-pointing gesture and a second reference point corresponding to a height of the wrist on a first perpendicular line perpendicularly extending from a base of an arm of the user corresponding to the finger-pointing gesture to a floor surface toward a wrist side.

Also, according to the present disclosure, an information processing system is provided. The information processing system includes a detection unit that detects an object selected by a user with a finger-pointing gesture as a selected object. The detection unit detects the selected object on a basis of a first extension line extending from a first line segment connecting a first reference point indicating a position of a wrist of a hand of the user corresponding to the finger-pointing gesture and a second reference point corresponding to a height of the wrist on a first perpendicular line perpendicularly extending from a base of an arm of the user corresponding to the finger-pointing gesture to a floor surface toward a wrist side.

Moreover, according to the present disclosure, an information processing method for detecting an object selected by a user with a finger-pointing gesture as a selected object is provided. The information processing method includes detecting, by an information processing apparatus, the selected object on a basis of a first extension line extending from a first line segment connecting a first reference point indicating a position of a wrist of a hand of the user corresponding to the finger-pointing gesture and a second reference point corresponding to a height of the wrist on a first perpendicular line perpendicularly extending from a base of an arm of the user corresponding to the finger-pointing gesture to a floor surface toward a wrist side.

DESCRIPTION OF EMBODIMENTS

Figure 1:
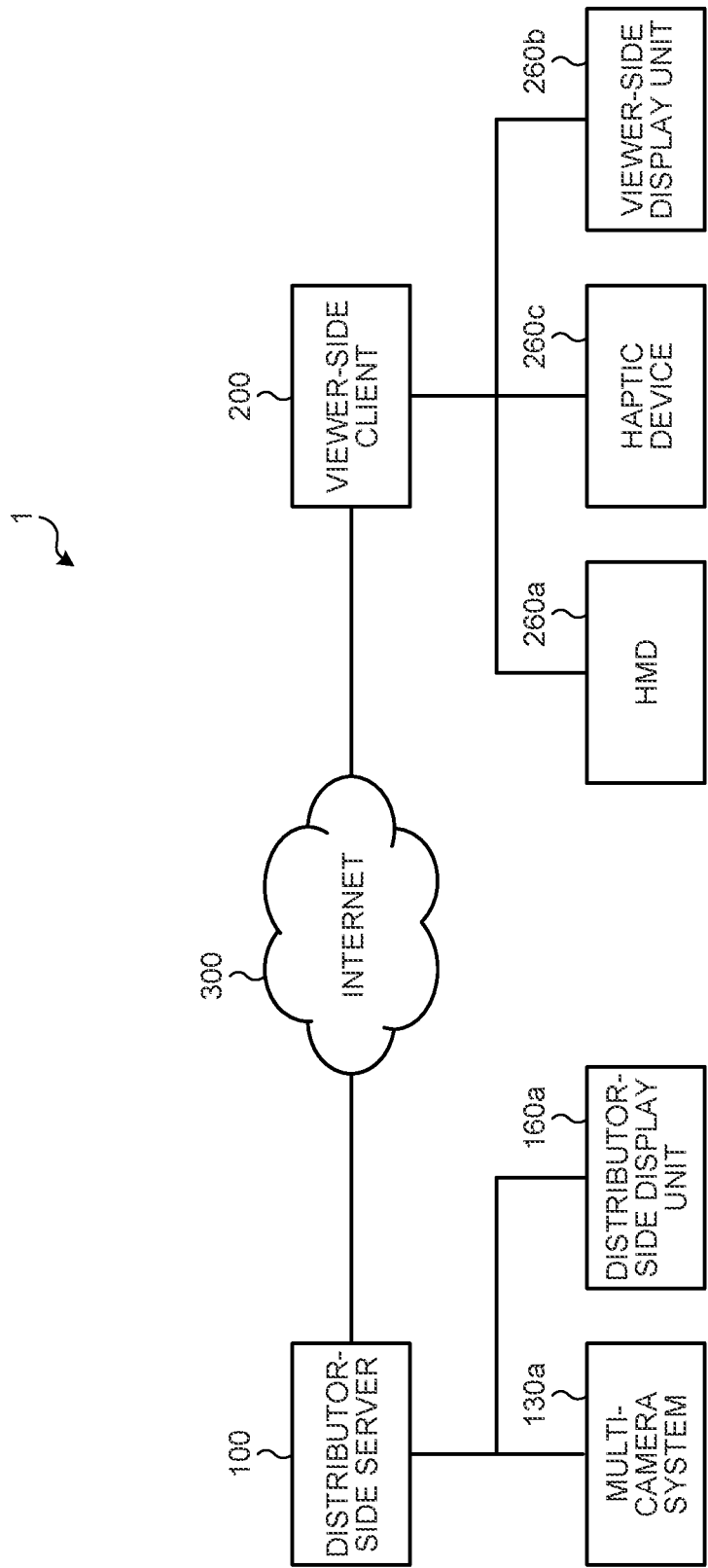
FIG. 1 is a system diagram illustrating a schematic configuration of a bidirectional viewing system 1 according to an embodiment of the present disclosure.

Preferred embodiments of the present disclosure will be described in detail hereinbelow with reference to the accompanying drawings. Note that redundant descriptions will be omitted from the present specification and the drawings by assigning the same reference signs to components having substantially the same functional configuration.

Further, in this specification and the drawings, a plurality of components having substantially the same or similar functional configuration may be distinguished by assigning the same reference numerals followed by different numbers in some cases. However, when it is unnecessary to particularly distinguish each of the plurality of components having substantially the same or similar functional configuration, only the same reference numeral is assigned. Further, similar components of different embodiments may be distinguished by assigning the same reference numerals followed by different alphabets in some cases. However, when it is unnecessary to particularly distinguish each of the similar components, only the same reference numeral is assigned.

Note that, in the following description, a virtual object means a virtual object that can be perceived by an artist (user) or a viewer as a real object existing in a real space. For example, the virtual object can have various forms such as text, icons, or animation.

Further, in the following description, unless otherwise specified, the artist may be a virtual object including a live-action volumetric or the like in addition to a computer graphics (CG) image representing the artist, or may be the artist himself/herself existing in a real space in augmented reality (AR). Further, similarly, the viewer may be a virtual object including a live-action volumetric or the like in addition to a CG image representing the viewer, or may be the viewer himself/herself existing in a real space in AR.

Note that the description will be given in the following order.

1. Bidirectional viewing system 1
1.1 Outline of bidirectional viewing system 1
1.2 Detailed configuration of distributor-side server 100
1.3 Detailed configuration of multi-camera system 130a
1.4 Detailed configuration of viewer-side client 200
1.5 External configuration of HMD 260a
1.6 External configuration of haptic device 260c
2. Technical background of the present disclosure
3. Outline of the embodiments of the present disclosure
4. First Embodiment
4.1 Detailed configuration of detection unit 100a
4.2 Information processing method
4.3 First modification
4.4 Second modification
4.5 Third modification
5. Second Embodiment
5.1 Detection mode
5.2 Information processing method
6. Examples according to the embodiments
6.1 First example
6.2 Second example
6.3 Third example
6.4 Fourth example
6.5 Fifth example
6.6 Sixth example
6.7 Seventh example
6.8 Eighth example
6.9 Ninth example
6.10 Tenth example
7. Conclusion
8. Regarding hardware configuration
9. Supplement

1. BIDIRECTIONAL VIEWING SYSTEM 1

1.1 Outline of Bidirectional Viewing System 1

First, before describing details of the embodiments of the present disclosure, an outline of the bidirectional viewing system (information processing system) 1 according to the embodiments of the present disclosure will be described with reference to FIG. 1. FIG. 1 is a system diagram illustrating a schematic configuration of the bidirectional viewing system 1 according to an embodiment of the present disclosure. In the following description, in the bidirectional viewing system 1, the artist (distributor and user) and the viewer may exist in different real spaces or may exist in the same real space. In the bidirectional viewing system 1, the viewer views the appearance of the artist via, for example, a live-action volumetric (stereoscopic video) displayed in a virtual space on the viewer side or a CG image (for example, an avatar or the like) projected (in the following description, "display" includes "projection and the like") in the real space, and the artist can confirm the appearance of the viewer via a CG image (for example, an avatar or the like), a live-action volumetric, or the like drawn in a virtual space on the artist side, or a CG image (for example, an avatar or the like) displayed in the real space. Moreover, in the present embodiments, the bidirectional viewing system 1 senses, with a sensor, a selection motion in which the artist selects a (for example, a selection target) viewer, and detects the viewer selected by the artist on the basis of sensing data by the sensor. Then, the bidirectional viewing system 1 communicably connects a selected viewer-side device and an artist-side device to form a channel for interaction between the selected viewer and the artist.

Note that the bidirectional viewing system 1 described here is an example of the information processing system used in the embodiments of the present disclosure, and the embodiments of the present disclosure are not limited to use of such a system. For example, in the embodiments of the present disclosure, the content may be provided to the viewer in a case where the artist and the viewer exist in physically distant real spaces (for example, a studio, a room at home, and the like), or the content may be provided to the viewer in a case where the artist and the viewer exist in the same real space (for example, a concert, an event, or the like). In such cases, it is assumed that the information processing system controls a device (for example, a head mounted display (HMD), a smartphone, or the like) held or worn by a viewer selected by an artist or a nearby device (for example, lighting, projector, speaker, or the like).

Further, in the following description, a case where the artist and the viewer exist in physically distant real spaces and share the same virtual space (that is, the respective avatars and the like exist in the same virtual space) (hereinafter, referred to as virtual reality (VR) space sharing) will be exemplified, but it is not limited thereto, and the technology according to the present disclosure can be applied to various systems capable of linking the virtual space and the real space in some form, such as a case where the artist and the viewer exist in the same real space and a CG image or the like is displayed in the real space (hereinafter, referred to as AR space sharing). However, in the VR space sharing, it is not essential that the real spaces to which the artist and the viewer belong are physically distant, and they may share the virtual space (hereinafter, also referred to as a VR space) while they exist in the same real space. Similarly, in the AR space sharing, it is not essential that the artist and the viewer belong to the same real space, and they may share an augmented space (hereinafter, also referred to as an AR space) while they exist in physically distant real spaces.

As illustrated in FIG. 1, the bidirectional viewing system 1 according to the present embodiments can include, for example, a distributor-side server (information processing apparatus) 100, a multi-camera system 130a, a distributor-side display unit 160a, a viewer-side display unit 260b, a viewer-side client 200, an HMD 260a, and a haptic device 260c. The distributor-side server 100 and the viewer-side client 200 can communicate with each other via various communication networks such as the Internet 300. Note that the number of apparatuses included in the bidirectional viewing system 1 is not limited to the numbers illustrated in FIG. 1, but may be more. Further, the bidirectional viewing system 1 may include an apparatus not illustrated in FIG. 1. For example, the bidirectional viewing system 1 can include a general-purpose personal computer (PC), a tablet terminal, a game machine, a mobile phone such as a smartphone, a portable media player, a speaker, a projector, a display (digital signage or the like), a wearable device such as a headphone, smart glasses, or a smart watch, a robot (for example, a humanoid robot, an automatic driving vehicle, or the like), or the like. Hereinafter, the outline of each apparatus included in the bidirectional viewing system 1 according to the embodiments of the present disclosure will be described.

(Distributor-Side Server 100)

The distributor-side server 100 can acquire at least one piece of sensing data (captured image, motion data, voice, position information, or the like) regarding one or a plurality of artists (users). Moreover, the distributor-side server 100 can process the acquired sensing data to generate content data for distribution (for example, live-action volumetric, CG image, voice data, or the like), and distribute the content data for distribution to the viewer-side client 200 described below. Further, the distributor-side server 100 can acquire distribution data (for example, position information, posture information, voice data, or the like) based on at least one piece of sensing data (for example, position information, captured image, motion data, voice, or the like) related to one or a plurality of viewers (objects) from the viewer-side client 200. Note that a detailed configuration of the distributor-side server 100 will be described below.

(Multi-Camera System 130a)

The multi-camera system 130a includes a plurality of visible light cameras 132 (see FIG. 3) that captures an artist from multiple viewpoints, or the like, and can output sensing data (for example, captured image) obtained by imaging or the like to the distributor-side server 100 described above. The cameras 132 may image surroundings of the artist, a real object existing around the artist, or the like. The multi-camera system 130a may include not only the plurality of visible light cameras 132 that captures the artist, but also an infrared (IR) camera 134a that images a marker 134b (see FIG. 3) worn on a part of the body of the artist, and may include a depth sensor 136 (see FIG. 3) that senses the posture of the body of the artist. Further, the multi-camera system 130a may include a plurality of inertial measurement units (IMUs) (illustration omitted) attached to a part of the body of the artist. Each IMU includes an acceleration sensor (illustration omitted) and an angular velocity sensor (illustration omitted), and can sense the artist's posture and movement according to the obtained sensing data. Note that, in the present embodiments, the multi-camera system 130a may include a geomagnetic sensor (illustration omitted), a barometric pressure sensor (illustration omitted), or the like as a motion sensor, in addition to the IMU.

Moreover, the multi-camera system 130*a* may include a position sensor (illustration omitted) that senses the position of the user, a sound sensor (illustration omitted) that senses the voice of the artist and surrounding environmental sounds around the artist, a line-of-sight sensor (illustration omitted) that senses the line of sight of the artist, a biometric information sensor (illustration omitted) that senses biometric information of the artist (for example, a sensor that senses heart rate, pulse, brain waves, respiration, sweating, myoelectric potential, skin temperature, skin electrical resistance, eye movement, pupil diameter, or the like), and an input apparatus (illustration omitted) that receives text or the like input by the artist, and is not particularly limited.

More specifically, for example, the above-described position sensor is a sensor that senses the position of the artist, and can be a global navigation satellite system (GNSS) receiver or the like. In this case, the position sensor acquires sensing data indicating latitude and longitude information (position information in the global coordinate system) of the current location of the artist on the basis of a signal from a GNSS satellite. Further, for example, a radio frequency identification (RFID), a Wi-Fi access point, or the like can sense a relative positional relationship of a user from information of a radio base station or the like, and thus, in the present embodiments, such a communication apparatus may be used as the position sensor. Note that a detailed configuration of the multi-camera system 130*a* will be described below.

(Distributor-Side Display Unit 160*a*)

The distributor-side display unit 160*a* is realized by, for example, a tablet (illustration omitted) or a smartphone (illustration omitted) held by the artist, a projector (illustration omitted), a display (illustration omitted), or the like installed in a real space where the artist exists that is communicably connected to the distributor-side server 100. The distributor-side display unit 160*a* can display text, icons, animation, or the like in the real space where the artist exists. For example, the distributor-side display unit 160*a* can display images of a plurality of viewers existing in a space different from that of the artist in the real space where the artist exists in the form of virtual objects such as avatars (CG images). At this time, the images of the viewers are displayed such that a relative positional relationship between the artist and the images of the viewers in the virtual space (may be substantially equivalent to a real space. The same applies hereinafter) expressed on the artist side corresponds to a relative positional relationship between the image of the artist (for example, live-action volumetric or the like) displayed in the virtual space on the viewer side and each viewer.

(Viewer-Side Client 200)

The viewer-side client 200 can acquire distribution content data acquired from the distributor-side server 100 described above and provide the acquired distribution content data to the viewer via the HMD 260*a*, the viewer-side display unit 260*b*, and the haptic device 260*c*. Note that the HMD 260*a* is basically a device for the purpose of VR space sharing, but can also be used for AR space sharing. Similarly, the viewer-side display unit 260*b* is basically a device for the purpose of AR space sharing, but can also be used for VR space sharing.

Further, the viewer-side client 200 can acquire at least one piece of sensing data (captured image, motion data, voice, position information, or the like) regarding one or a plurality of viewers, and transmit the sensing data to the distributor-side server 100. Note that a detailed configuration of the viewer-side client 200 will be described below.

(HMD 260*a*)

The HMD 260*a* is communicably connected to the viewer-side client 200, and can display the video of the virtual space on the basis of the distribution content data. For example, the HMD 260*a* may display a live-action volumetric of the artist in the virtual space. At this time, the relative positional relationship between the image of the artist displayed in the virtual space on the listener side and the viewer preferably corresponds to the relative positional relationship between the images of the viewers in the virtual space expressed on the artist side and the artist.

Figure 7:
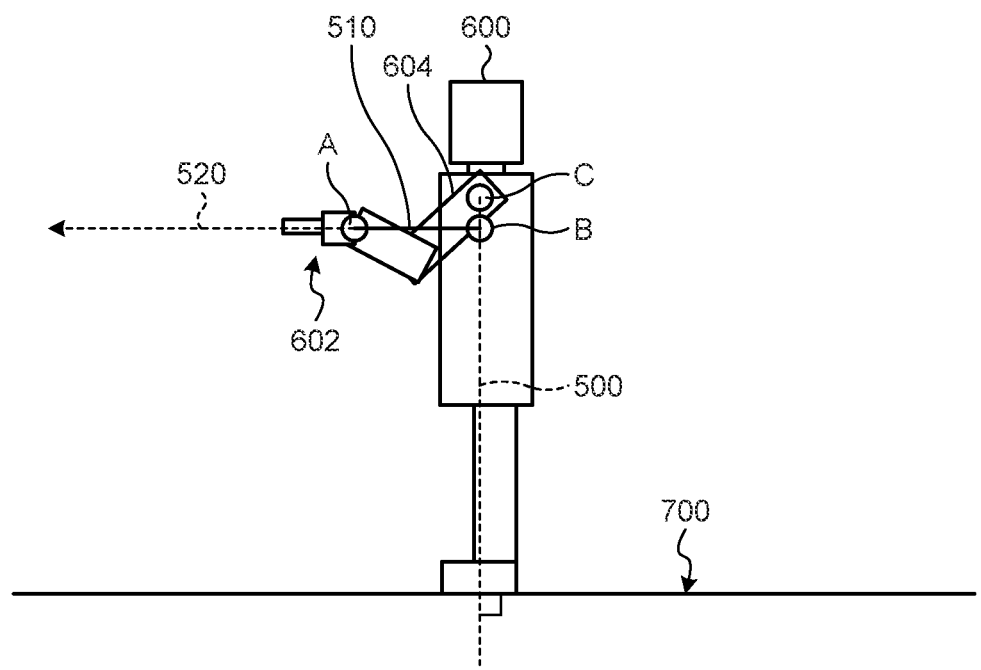
FIG. 7 is an explanatory diagram for explaining an outline of an embodiment of the present disclosure.

The HMD 260*a* can be realized by, for example, a glasses-type HMD worn on the head of the viewer as illustrated in FIG. 7. Then, a display unit (illustration omitted) corresponding to the spectacle lens portion located in front of the eyes of the viewer at the time of wearing is a transmissive display capable of visually recognizing the outside of the spectacle lens portion or a non-transmissive display incapable of visually recognizing the outside of the spectacle lens portion, and can display a virtual object. Note that, in the above description, it has been described that the HMD 260*a* is mounted on the head of the viewer and communicably connected to the viewer-side client 200, but the present embodiments are not limited thereto. In the present embodiments, for example, the HMD 260*a* may be worn on the head of the artist and communicably connected to the distributor-side server 100.

Further, in a case where the HMD 260*a* has an optical see-through or video see-through function, the HMD 260*a* can also serve as a display device for realizing AR space sharing. For example, in a case where the HMD 260*a* is a non-transmissive display, an image of the real space where the viewer exists, captured by a camera (illustration omitted) that captures the viewer's expression or the surroundings of the viewer, can be displayed on the above-described non-transmissive display (video see-through). As described above, in a case where the HMD 260*a* has an optical see-through or video see-through function, the HMD 260*a* can display, for example, a live-action volumetric of the artist in the real space where the viewer exists.

Moreover, the HMD 260*a* may include a speaker (illustration omitted), an IMU (illustration omitted), a geomagnetic sensor (illustration omitted), a barometric pressure sensor (illustration omitted), a position sensor (illustration omitted), a sound sensor (illustration omitted), a line-of-sight sensor (illustration omitted), a biometric information sensor (illustration omitted), or the like. Note that an appearance example of the HMD 260*a* will be described below.

Moreover, in the present embodiments, the bidirectional viewing system 1 may include a wearable device (illustration omitted) in another form in addition to the HMD 260*a*, which is a glasses-type wearable device worn on the head. Examples of the wearable device include wearable devices in various forms such as an ear device (headphone) type, an anklet type, a bracelet type, a collar type, a glove type, a pad type, a badge type, and a clothing type.

(Viewer-Side Display Unit 260*b*)

The viewer-side display unit 260*b* is realized by, for example, a tablet (illustration omitted) or a smartphone (illustration omitted) held by the viewer, a projector (illustration omitted), a display (illustration omitted), or the like installed in a real space where the viewer exists that is communicably connected to the viewer-side client 200. The viewer-side display unit 260*b* can display text, icons, animation, or the like in the real space where the viewer exists.

For example, the viewer-side display unit 260b can display the image of the artist in the real space where the viewer exists. At this time, the relative positional relationship between the image of the artist in the virtual space expressed on the listener side and the viewer preferably corresponds to the relative positional relationship between the images of the viewers in the virtual space expressed on the artist side and the artist.

(Haptic Device 260c)

The haptic device 260c is communicably connected to the viewer-side client 200, is held by the viewer or worn on a part of the body of the viewer, and vibrates or the like according to the distribution content data, so that it is possible to give tactile stimulation to the viewer. For example, the haptic device 260c can include a vibration apparatus (illustration omitted) that gives vibration to the viewer, an electrical stimulation apparatus (illustration omitted) that gives electrical stimulation to the viewer, and the like. Moreover, the haptic device 260c may include an IMU (illustration omitted), a geomagnetic sensor (illustration omitted), a barometric pressure sensor (illustration omitted), a position sensor (illustration omitted), a sound sensor (illustration omitted), a biometric information sensor (illustration omitted), or the like. Further, such an apparatus that gives tactile stimulation to the viewer may be included in the above-described HMD 260a, various wearable devices, a smartphone held by the viewer, or the like. Note that an appearance example of the haptic device 260c will be described below.

1.2 Detailed Configuration of Distributor-Side Server 100

Figure 2:
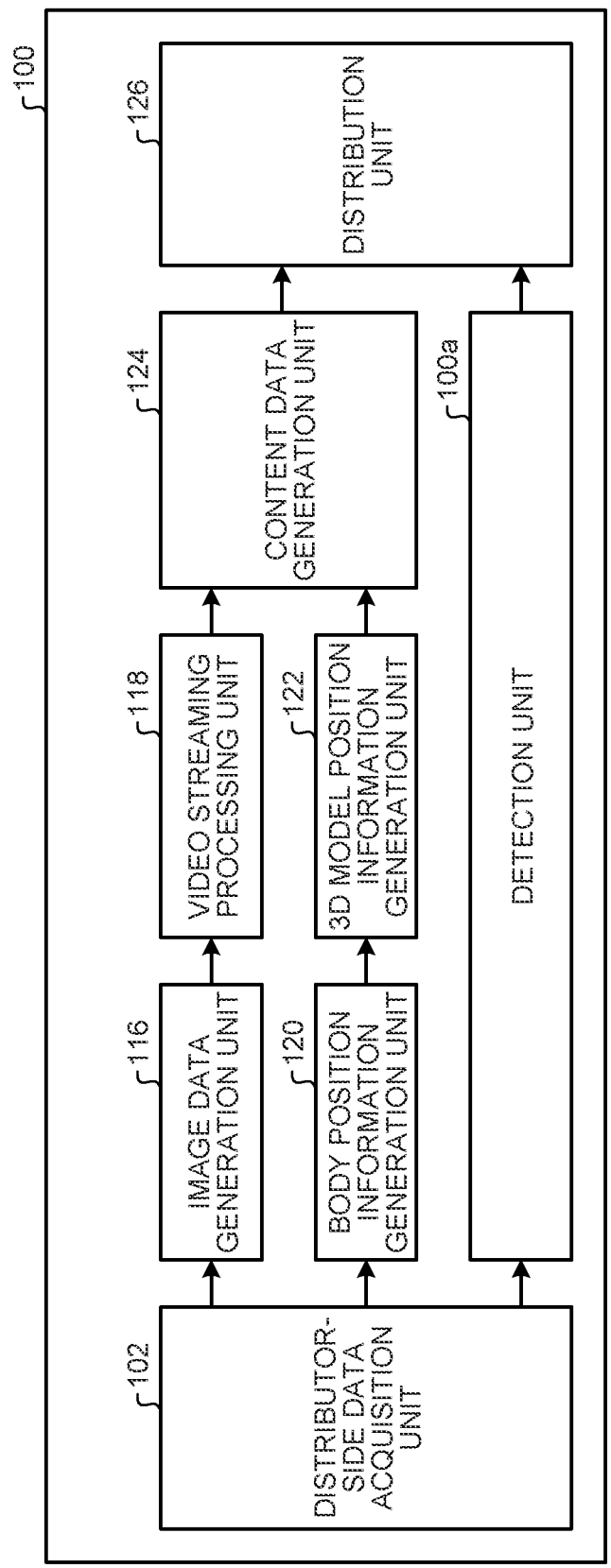
FIG. 2 is a diagram illustrating a functional configuration of a distributor-side server 100 according to an embodiment of the present disclosure.

Next, a detailed configuration of each apparatus included in the bidirectional viewing system 1 according to the embodiments of the present disclosure will be sequentially described. First, a detailed configuration of the distributor-side server 100 will be described with reference to FIG. 2. FIG. 2 is a diagram illustrating a functional configuration of the distributor-side server 100 according to the embodiments of the present disclosure. As described above, the distributor-side server 100 according to the present embodiments can acquire at least one piece of sensing data regarding the artist, process the acquired sensing data, generate content data for distribution, and distribute the content data for distribution to the viewer-side client 200. As illustrated in FIG. 2, the distributor-side server 100 mainly includes a detection unit 100a, a distributor-side data acquisition unit 102, an image data generation unit 116, a video streaming processing unit 118, a body position information generation unit 120, a 3D model position information generation unit 122, a content data generation unit 124, and a distribution unit 126. The functional blocks of the distributor-side server 100 will be sequentially described below. Note that the detection unit 100a, which is a main part of the embodiments of the present disclosure, will be described below.

(Distributor-Side Data Acquisition Unit 102)

The distributor-side data acquisition unit 102 can acquire the sensing data (for example, captured image, motion data, voice, position information, or the like) regarding the artist from the multi-camera system 130a or the like, and output the sensing data to the detection unit 100a, the image data generation unit 116, and the body position information generation unit 120 to be described below. For example, the distributor-side data acquisition unit 102 acquires captured images of the artist from multiple viewpoints from the multi-camera system 130a, for example, and outputs the captured images to the image data generation unit 116. Further, the distributor-side data acquisition unit 102 acquires a captured image from the multi-camera system 130a from which the posture and movement of the artist can be known or sensing data regarding the posture and movement of the artist from the IMU (illustration omitted), and outputs the captured image or sensing data to the body position information generation unit 120. Note that, although not illustrated in FIG. 2, the distributor-side server 100 includes a viewer-side data acquisition unit that acquires at least one piece of sensing data (for example, captured image, motion data, voice, position information, or the like) related to one or a plurality of viewers or distribution data generated on the basis of the sensing data from the viewer-side client 200, and the viewer-side data acquisition unit can output the acquired data to the image data generation unit 116 to be described below.

(Image Data Generation Unit 116)

The image data generation unit 116 generates a video acquired from the multi-viewpoint camera of the multi-camera system 130a as display data. Moreover, the image data generation unit 116 can output the generated display data to the video streaming processing unit 118 described below. For example, from the distributor-side server 100 to the viewer-side client 200, a performer video (for example, live-action volumetric)+a CG image (for example, an avatar) is transmitted in VR space sharing, a performer video+a CG image is transmitted in AR space sharing, and a CG image is transmitted in the real world.

(Video Streaming Processing Unit 118)

The video streaming processing unit 118 can perform processing for streaming distribution on the generated display data and output the data to the content data generation unit 124 described below.

(Body Position Information Generation Unit 120)

The body position information generation unit 120 can generate position information and posture information of the artist on the basis of the captured image acquired from the multi-camera system 130a from which the posture and movement of the artist can be known or the sensing data regarding the posture and movement of the artist acquired from the plurality of IMUs (illustration omitted). Moreover, the body position information generation unit 120 can output the generated position information and posture information of the artist to the 3D model position information generation unit 122 described below.

(3D Model Position Information Generation Unit 122)

The 3D model position information generation unit 122 can generate 3D model position information including skeleton information representing the position and posture of the body of the artist by a skeleton structure on the basis of the position information and the posture information. Then, the 3D model position information generation unit 122 can output the generated 3D model position information to the content data generation unit 124 described below. For example, the skeleton structure includes information of each part of the body of the artist and a bone that is a line segment connecting the parts. Note that the parts in the skeleton structure correspond to, for example, an end part, a joint part, or the like of the body. Further, the bones in the skeleton structure may correspond to, for example, human bones, but the positions and the number of the bones need not necessarily match the actual human skeleton.

(Content Data Generation Unit 124)

The content data generation unit 124 can generate distribution content data on the basis of the stereoscopic image data and the 3D model position information (for example, the skeleton information is combined with the image of the artist of the stereoscopic image data), and output the distribution content data to the distribution unit 126 described below.

(Distribution Unit 126)

The distribution unit 126 can distribute the distribution content data to the viewer-side client 200.

Note that, in the present embodiments, the functional blocks included in the distributor-side server 100 are not limited to the functional blocks illustrated in FIG. 2.

1.3 Detailed Configuration of Multi-Camera System 130a

Figure 3:
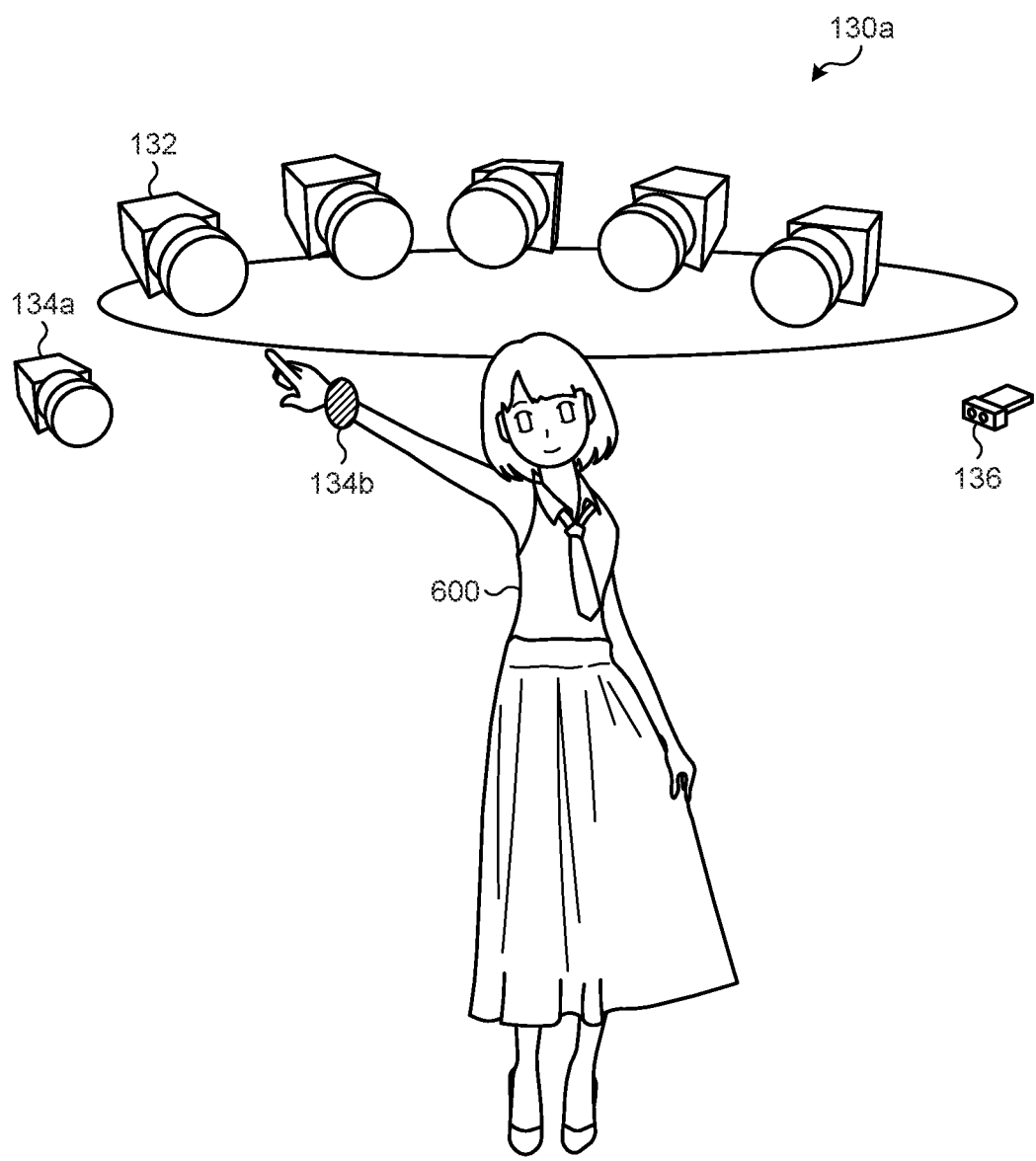
FIG. 3 is a diagram illustrating a configuration of a multi-camera system 130a according to an embodiment of the present disclosure.

Next, a detailed configuration of the multi-camera system 130a will be described with reference to FIG. 3. FIG. 3 is a diagram illustrating a configuration of the multi-camera system 130a according to an embodiment of the present disclosure. As described above, the multi-camera system 130a according to the present embodiments includes the plurality of visible light cameras 132 that captures an artist 600 from multiple viewpoints, or the like, and can output the captured images obtained by the cameras 132 to the distributor-side server 100 described above.

In detail, as illustrated in FIG. 3, the plurality of visible light cameras 132 is installed so as to surround the artist 600, and these cameras 132 capture the artist 600 at different angles. Therefore, it is possible to obtain a stereoscopic image of the artist 600 by combining the captured images acquired by the respective cameras 132 in consideration of the relative positional relationship of the plurality of cameras 132. Moreover, in the present embodiments, by extracting an image of each part of the body of the artist 600 from each captured image and performing processing on the basis of the position of each camera 132, the position information and posture information of each part of the artist 600 can be acquired. Note that, as described above, the multi-camera system 130a may include not only the plurality of visible light cameras 132, but also the IR camera 134a that captures the marker 134b worn on a part of the body of the artist 600, and may include the depth sensor 136 that senses the posture of the artist 600.

Further, in the present embodiments, for example, in order to combine the above-described captured images and acquire information, e.g., of the position and posture of each part of the body of the artist 600, from the captured images, a local coordinate system having an origin virtually provided on the real space on the artist 600 side as a reference is set. For example, the position of each camera 132, the position of each part of the body of the artist 600, and the floor surface on which the artist 600 is standing can also be expressed by the local coordinate system.

Further, as described above, the multi-camera system 130a may include the plurality of IMUs (illustration omitted) attached to a part of the body of the artist 600, and the IMUs may include an acceleration sensor (illustration omitted) or an angular velocity sensor (illustration omitted). In the present embodiments, the position information and posture information of the position of the part where each IMU is attached can be generated on the basis of the sensing data regarding the posture and movement of the artist acquired from the plurality of IMUs, and moreover, the 3D model position information including the skeleton information expressing the position and posture of the body of the artist 600 by the skeleton structure can be generated. In detail, in the present embodiments, for example, inertial navigation system can be used to calculate the position of the part where the IMU is attached from the sensing data from the IMU, and the skeleton information can be acquired by forward kinematics (FK) calculation according to the position information or the like of the IMU. Here, the forward kinematics calculation is a method of calculating the position of the end part on the basis of the posture of each joint part. Further, in the present embodiments, the skeleton information may be acquired using inverse kinematics (IK) calculation instead of the forward kinematics calculation described above. Here, the inverse kinematics calculation is a method of calculating the posture of each joint part on the basis of the position of the end part.

Note that, in the present embodiments, the apparatuses included in the multi-camera system 130a are not limited to the apparatuses illustrated in FIG. 3.

1.4 Detailed Configuration of Viewer-Side Client 200

Figure 4:
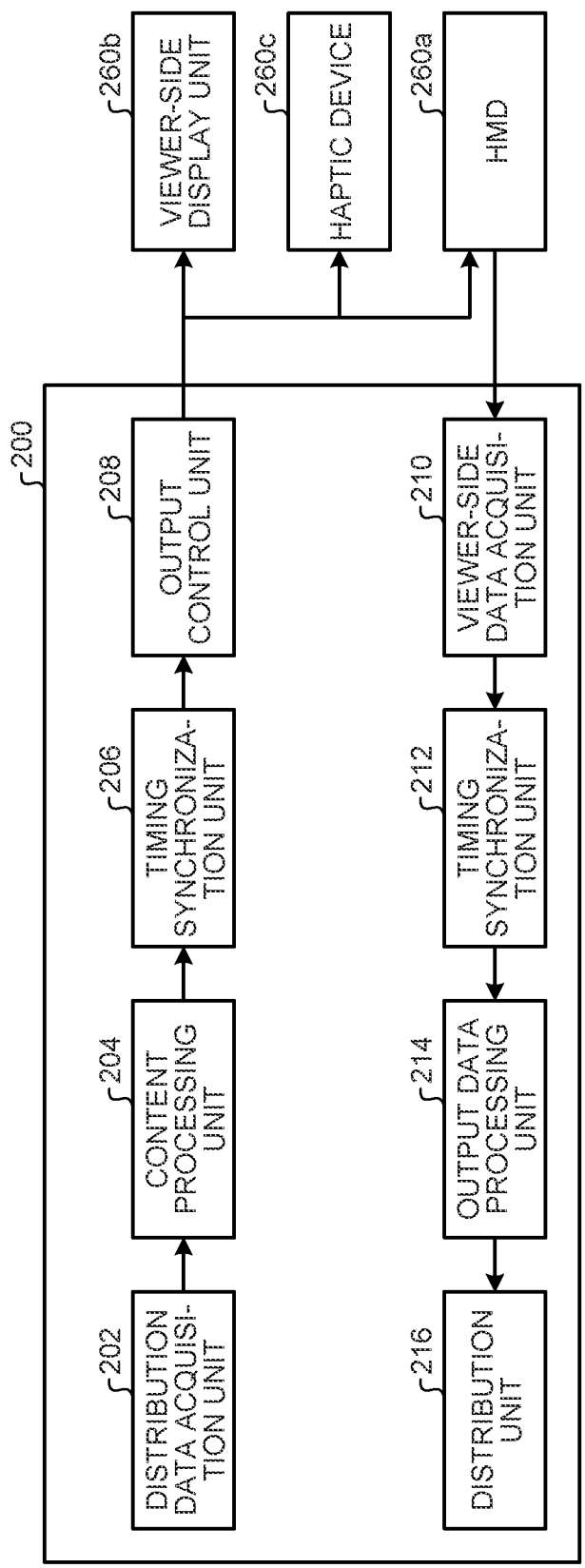
FIG. 4 is a diagram illustrating a functional configuration of a viewer-side client 200 according to an embodiment of the present disclosure.

Next, a detailed configuration of the viewer-side client 200 will be described with reference to FIG. 4. FIG. 4 is a diagram illustrating a functional configuration of the viewer-side client 200 according to the embodiments of the present disclosure. As described above, the viewer-side client 200 according to the present embodiments can acquire distribution content data acquired from the distributor-side server 100 and provide the acquired distribution content data to the viewer via the HMD 260a, the viewer-side display unit 260b, the haptic device 260c, or the like. As illustrated in FIG. 4, the viewer-side client 200 mainly includes a distribution data acquisition unit 202, a content processing unit 204, timing synchronization units 206 and 212, an output control unit 208, a viewer-side data acquisition unit 210, an output data processing unit 214, and a distribution unit 216. The functional blocks of the viewer-side client 200 will be sequentially described below.

(Distribution Data Acquisition Unit 202)

The distribution data acquisition unit 202 can acquire the distribution content data from the distributor-side server 100 and output the distribution content data to the content processing unit 204 described below.

(Content Processing Unit 204)

The content processing unit 204 can perform processing of providing the acquired distribution content data to the viewer via the HMD 260a, the viewer-side display unit 260b, the haptic device 260c, or the like and output the distribution content data to the timing synchronization unit 206 described below.

(Timing Synchronization Units 206 and 212)

The timing synchronization unit 206 can synchronize the output timings of the respective pieces of processed distribution content data to be provided to the viewer via the HMD 260a, the viewer-side display unit 260b, the haptic device 260c, or the like, and output the distribution content data to the output control unit 208 described below. Further, the timing synchronization unit 212 can synchronize a plurality of pieces of sensing data from the viewer-side data acquisition unit 210 to be described below, and output the plurality of pieces of sensing data to the output data processing unit 214 to be described below.

(Output Control Unit 208)

The output control unit 208 can control the HMD 260a, the viewer-side display unit 260b, the haptic device 260c, or the like on the basis of respective pieces of processed distribution content data from the timing synchronization unit 206.

(Viewer-Side Data Acquisition Unit 210)

The viewer-side data acquisition unit 210 can acquire at least one piece of sensing data (for example, captured image, motion data, voice, position information, or the like) regarding one or a plurality of viewers, and transmit the sensing data to the timing synchronization unit 212.

(Output Data Processing Unit 214)

The output data processing unit 214 can perform processing for distributing the sensing data from the timing synchronization unit 212 to the distributor-side server 100 and output the sensing data to the distribution unit 216 described below.

(Distribution Unit 216)

The distribution unit 216 can distribute the sensing data processed by the output data processing unit 214 to the distributor-side server 100.

Note that, in the present embodiments, the functional blocks included in the viewer-side client 200 are not limited to the functional blocks illustrated in FIG. 4.

1.5 External Configuration of HMD 260a

Figure 5:
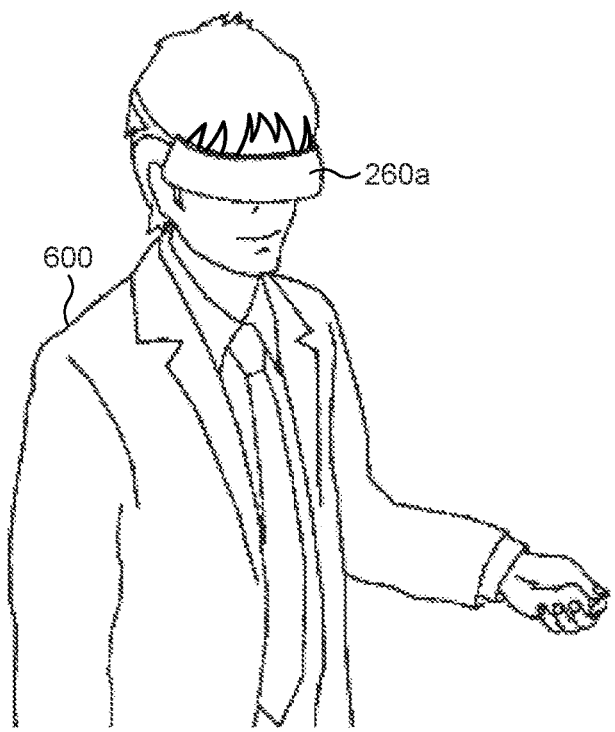
FIG. 5 is a diagram illustrating an external configuration of an HMD 260a according to an embodiment of the present disclosure.

Next, an external configuration of the HMD 260a will be described with reference to FIG. 5. FIG. 5 is a diagram illustrating an external configuration of the HMD 260a according to the embodiments of the present disclosure. As described above, the HMD 260a according to the present embodiments can display the video of the virtual space according to the distribution content data or the like.

As illustrated in FIG. 5, the HMD 260a is realized by, for example, a glasses-type HMD worn on the head of the viewer. In detail, a display unit (illustration omitted) corresponding to the spectacle lens portion located in front of the eyes of the viewer at the time of wearing may be a transmissive display capable of visually recognizing the outside of the spectacle lens portion or a non-transmissive display incapable of visually recognizing the outside of the spectacle lens portion.

Note that, in the case of AR space sharing, the optical see-through or the video see-through function of the HMD 260a is used, and in this case, even in a case where the HMD 260a is always worn like eyeglasses, the viewer can perceive the surrounding real space, so that the influence on the viewer's normal life can be suppressed. In such a case, the above-described display unit can display an image such as text or figures in the through state, that is, may display a virtual object in the real space as augmented reality (AR). Such a transmissive display uses, for example, a half mirror or a transparent light guide plate to hold a virtual image optical system including a transparent light guide portion or the like in front of the eyes of the viewer, and display a virtual object inside the virtual image optical system.

Further, in the present embodiments, the above-described HMD 260a is not limited to the form of displaying a virtual object for both eyes of the viewer, and may have a form of displaying a virtual object only for one eye of the viewer. Moreover, in the present embodiments, the above-described display unit may be realized as a light emitting diode (LED) light source or the like that directly projects a video on the retina of the viewer. That is, the HMD 260a may be realized as a projection type HMD.

Note that, in the present embodiments, the form of the HMD 260a is not limited to the example illustrated in FIG. 5, and may be, for example, a helmet type (for example, the visor portion of the helmet corresponds to the display) HMD.

Further, as described above, the HMD 260a can include a camera (illustration omitted) that captures the viewer's expression and the surroundings of the viewer, a speaker (illustration omitted), a position sensor (illustration omitted), or the like.

Moreover, in the present embodiments, for example, in order to acquire the position of the viewer with the above-described position sensor, a local coordinate system based on the origin virtually provided on the real space on the viewer side may be set. Furthermore, the position of the image (for example, a live-action volumetric or the like) of the artist 600 displayed in the virtual space on the viewer side can also be expressed by the above-described local coordinate system. Moreover, the relative positional relationship between the viewer and the image of the artist 600 in the local coordinate system in the real space on the viewer side corresponds to (for example, coincident with, similar to, or the like) the relative positional relationship between the artist 600 and the image of the viewer in the local coordinate system in the real space on the artist 600 side described above. That is, by matching the local coordinate system set in the real space on the artist side, the local coordinate system set in the real space on the viewer side, and the coordinate system of the virtual space shared by the artist 600 and a viewer 610, the positional relationship between the artist 600 and the viewer 610 on the artist side can be reproduced as it is on the viewer side.

1.6 External Configuration of Haptic Device 260c

Figure 6:
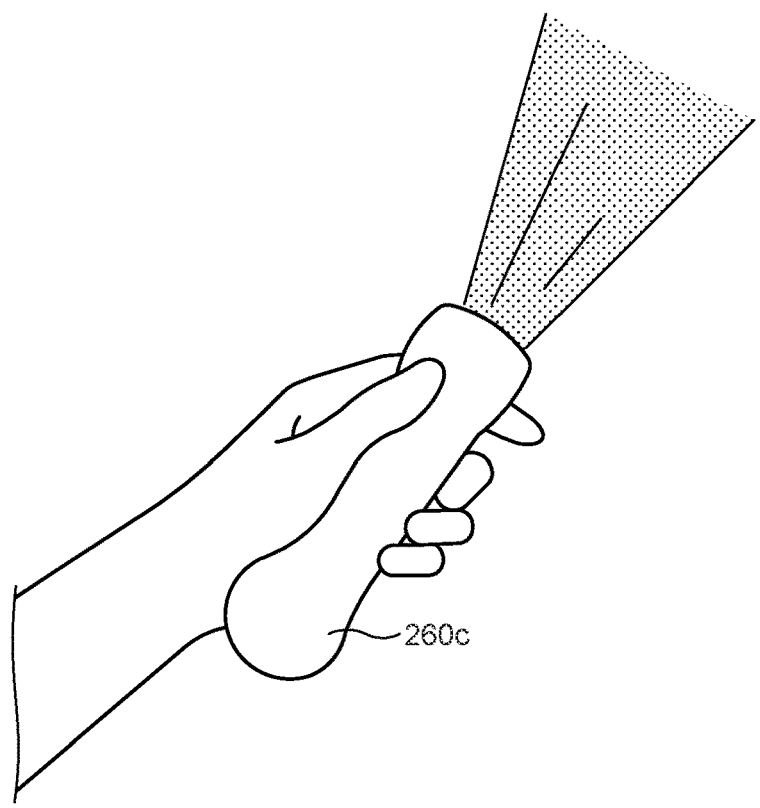
FIG. 6 is a diagram illustrating an external configuration of a haptic device 260c according to an embodiment of the present disclosure.

Next, an external configuration of the haptic device 260c will be described with reference to FIG. 6. FIG. 6 is a diagram illustrating an external configuration of the haptic device 260c according to the embodiments of the present disclosure. As described above, the haptic device 260c is an apparatus held by the viewer or worn on a part of the body of the viewer, and vibrates or the like according to the distribution content data to give tactile stimulation to the viewer.

For example, the haptic device 260c can be a controller-type haptic device as illustrated in FIG. 6. Specifically, a vibration apparatus (illustration omitted) is provided in a grip portion having a cylindrical shape of the haptic device 260c, and the vibration apparatus vibrates according to the distribution content data or the like, so that vibration can be given to the viewer gripping the grip portion. Further, the haptic device 260c can include an electrical stimulation apparatus (illustration omitted) that gives electrical stimulation to the viewer, and the like in addition to the above-described vibration apparatus. Moreover, as illustrated in FIG. 6, the haptic device 260c may include an irradiation apparatus that emits light according to the distribution content data or the like.

Note that, in the present embodiments, the form of the haptic device 260c is not limited to the example illustrated in FIG. 6, and may be, for example, a haptic device having a vest shape to be worn on the body of the viewer.

2. TECHNICAL BACKGROUND OF THE PRESENT DISCLOSURE

Moreover, before describing details of the embodiments of the present disclosure, description will be given of a background to creation of the embodiments of the present disclosure by the present inventors.

As described above, for example, there is a content providing method of generating a live-action volumetric of the artist 600 and allowing a large number of viewers to view the live-action volumetric displayed at a remote place away from the artist 600. In such a method, in order to make the experience created by the provision of the content better, it is required to provide the viewer with an interactive experience in which the artist 600 and the viewer feel as if they are in the same space and directly interact with each other. Then, as an example of the interactive experience, there is an interaction between the artist 600 and the viewer selected by the artist 600. In such a case, for example, the bidirectional viewing system 1 that provides the above-described content senses, with a sensor, a selection motion in which the artist 600 selects a viewer with which to interact, and detects the selected viewer on the basis of sensing data by the sensor. Then, the above-described bidirectional viewing system 1 communicably connects a selected viewer-side device and an artist 600-side device to form a channel for interaction.

The present inventors have intensively studied such a bidirectional viewing system 1, and in the process, in order for the bidirectional viewing system 1 to be less burdensome and more comfortable for the artist 600, the above-described selection motion is preferably a natural and intuitive motion (natural user interface: NUI) for the artist 600. However, with a bidirectional viewing system 1 that has been studied so far, it was difficult to accurately detect a viewer selected by the artist 600, or the artist 600 was required to perform an unnatural motion as a selection motion, so that it cannot be said that the level required by the present inventors has been reached.

In detail, with the bidirectional viewing system 1 that has been studied so far, for example, a selection motion of turning the face or chest to the viewer selected by the artist 600 is detected. In other words, the bidirectional viewing system 1 senses the face direction or the chest direction of the artist 600 with a sensor, and detects the viewer selected by the artist 600 on the basis of the sensed direction. In this case, since the face and the chest have a large area, the detection surface is wide, and it is easy to sense their directions with the sensor. However, it is difficult to say that the motion of turning the face or the chest to the selected viewer is a natural and intuitive motion for the artist 600, and thus the bidirectional viewing system 1 is not less burdensome and comfortable for the artist 600.

Further, as one of natural and intuitive selection motions for the artist 600, a finger-pointing gesture of pointing a finger at the selected viewer can be exemplified. Such motion is a daily motion, and thus it is possible to avoid a burden on the arm of the artist 600.

Thus, the present inventors have studied a case where the direction indicated by the fingertip in the finger-pointing gesture of the artist 600 is sensed by the sensor in the bidirectional viewing system 1 and the viewer selected by the artist 600 is detected on the basis of the sensed direction. In this case, as described above, since the finger-pointing gesture is a natural and intuitive motion, there is no burden on the artist 600. However, since the area of the fingertip is very narrow, the detection surface is narrow, and it is difficult to accurately sense the direction with the sensor. In addition, since the finger-pointing gesture is a motion of a human, it is difficult for the posture of the fingertip to be fixed for a predetermined time, and thus, it is difficult to accurately sense the direction of the fingertip with the sensor.

In such a situation, the present inventors have created the embodiments of the present disclosure described below that can accurately select a viewer selected by a natural and intuitive selection motion by the artist 600.

3. OUTLINE OF THE EMBODIMENTS OF THE PRESENT DISCLOSURE

An outline of the embodiments of the present disclosure created by the present inventors will be described with reference to FIG. 7. FIG. 7 is an explanatory diagram for explaining an outline of the embodiments of the present disclosure.

In the embodiments of the present disclosure, a finger-pointing gesture of pointing a finger toward the selected viewer is adopted as the selection motion of the artist 600. As described above, such a motion is a motion performed to point out an object or the like selected in daily life, and is a natural and intuitive motion, and therefore there is no burden on the artist 600. Moreover, it can be said that such a motion is a preferable motion since the meaning can be intuitively understood by the viewer or the like. Note that, in the embodiments of the present disclosure, the motion is not limited to the above-described finger-pointing gesture, but may be another gesture, a predetermined movement (for example, dance, body language, or the like) by the body of the artist 600, an aerial painting motion of performing an action of virtually drawing a trajectory in the air, or the like.

Then, the distributor-side server 100 of the bidirectional viewing system 1 according to the embodiments of the present disclosure can detect the viewer selected by the artist 600 as described below. In detail, the distributor-side server 100 includes the detection unit 100a (see FIG. 8) that detects the viewer selected by the artist 600 with the finger-pointing gesture. As illustrated in FIG. 7, the detection unit 100a detects the viewer (object) as the selected object on the basis of an extension line (first extension line) 520 extending from a line segment (first line segment) 510 connecting a reference point (first reference point) A indicating the position of the wrist of a hand 602 of the artist (user) 600 corresponding to the finger-pointing gesture and a reference point (second reference point) B corresponding to the height of the wrist on a perpendicular line (first perpendicular line) 500 perpendicularly extending from the base (reference point C) of an arm 604 of the artist 600 corresponding to the finger-pointing gesture to a floor surface 700 toward the wrist side. More specifically, the above-described detection unit 100a detects the viewer (object) corresponding to the point on the extension line (first extension line) 520 as the selected object. Note that, at this time, it is assumed that the relative positional relationship between the artist 600 and the image of the viewer in the virtual space expressed on the artist 600 side corresponds to the relative positional relationship between the viewer and the image of the artist 600 in the virtual space displayed on the viewer side.

In the embodiments of the present disclosure, by detecting the relative positions of the reference point A and the reference point C and the floor surface 700, the viewer selected by the artist 600 with the finger-pointing gesture can be selected. According to the embodiments of the present disclosure, since the reference point A indicating the position of the wrist of the hand 602 of the artist 600 and the reference point C indicating the position of the base of the arm 604 of the artist 600 corresponding to the finger-pointing gesture can be easily detected by the sensor, the viewer selected by the artist 600 by the method described above can be easily selected. Moreover, in the embodiments of the present disclosure, the finger-pointing gesture of performing finger-pointing toward the selected viewer is adopted as the selection motion of the artist 600, and as described above, the finger-pointing gesture is a motion performed to point out a selected object or the like in daily life, and is a natural and intuitive motion, and therefore, there is no burden on the artist 600. That is, according to the embodiments of the present disclosure, a viewer selected by a natural and intuitive selection motion by the artist 600 can be accurately selected. As a result, the bidirectional viewing system 1 makes it possible to easily provide the viewer with an interactive communication experience in which the artist 600 and a specific viewer feel as if they exist in the same space and directly interact with each other, and for example, the viewer can feel a stronger sense of unity with the artist 600.

Note that, in the above description, the selected object is the viewer (human) existing around the live-action volumetric of the displayed artist 600, but the embodiments of the present disclosure are not limited thereto. For example, the selected object may be a viewer (human) existing around the artist 600, or may be an animal, a still object (book, stationery, painting, photograph, vase, furniture), various apparatuses (robot, lighting, tablet, smartphone, display, HMD, smart glass, speaker, or the like) (real object) existing around the artist 600 or the image of the artist 600. Moreover, in the embodiments of the present disclosure, the selected object can be various displays (planar video (window or menu), stereoscopic video (stereoscopic graphic model, avatar, or the like) (virtual object), or the like displayed by the distributor-side display unit 160a such as a display or a projector. Further, in the embodiments of the present disclosure, on the assumption that the artist 600 and the selected object are located in a shared virtual space, the artist 600 and the selected object may be located in the same real space, or may be located in different real spaces.

Further, in the present embodiments, as a method of detecting the positions of the reference point A and the reference point C, the positions may be detected from a captured image obtained by the multi-camera system 130a, may be detected from a captured image by the IR camera 134a that captures the marker 134b worn on a part of the body of the artist 600, or may be detected from sensing data by the depth sensor 136 that detects the posture of the body of the artist. Further, in the present embodiments, the positions of the reference point A and the reference point C may be detected from sensing data obtained by the plurality of IMUs (illustration omitted), the geomagnetic sensor (illustration omitted), the barometric pressure sensor (illustration omitted), or the like worn on a part of the body of the artist 600. The details of the embodiments of the present disclosure like this will be sequentially described below.

4. FIRST EMBODIMENT

4.1 Detailed Configuration of Detection Unit 100a

Figure 8:
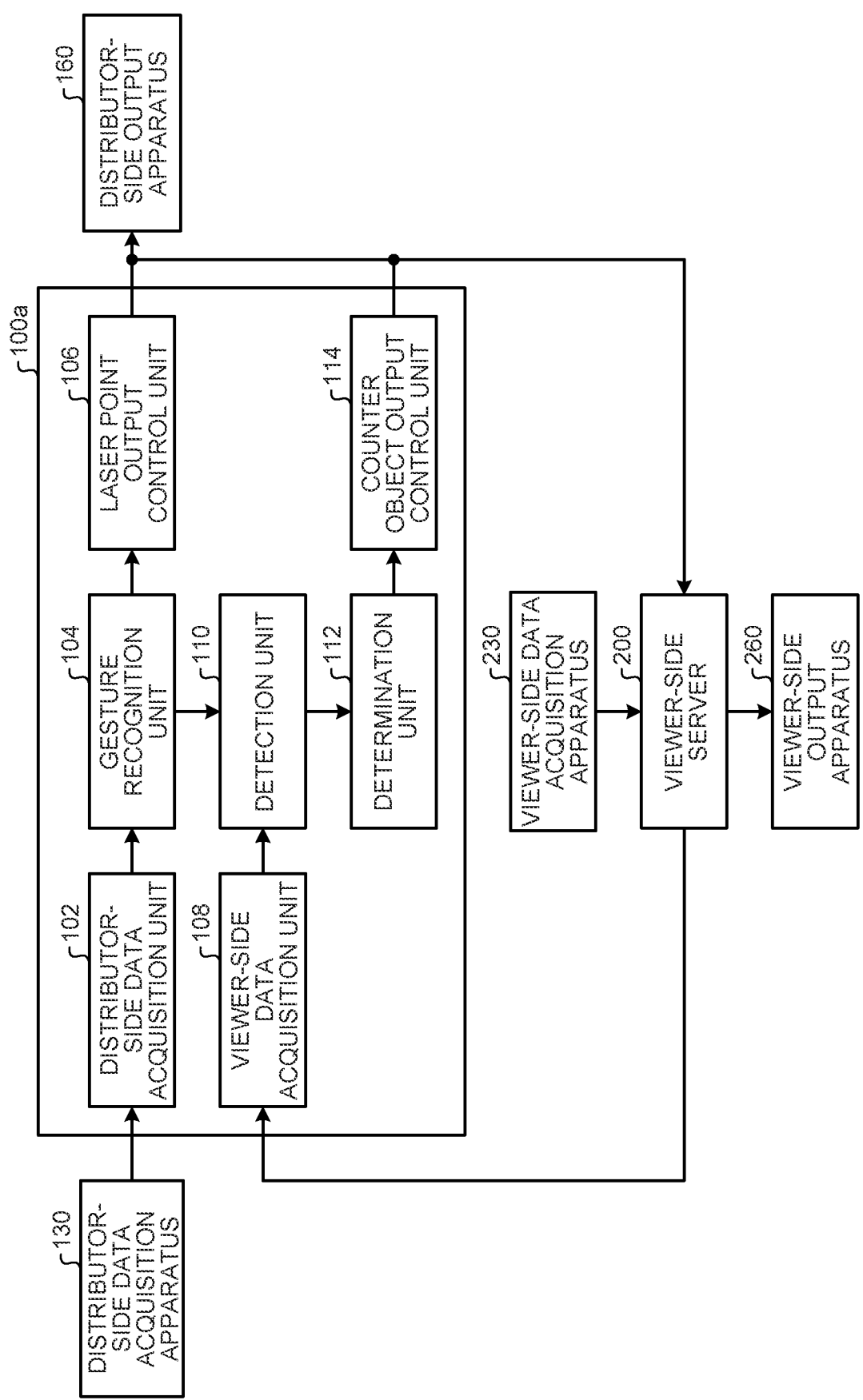
FIG. 8 is a diagram illustrating a functional configuration of a detection unit 100a according to a first embodiment of the present disclosure.
Figure 9:
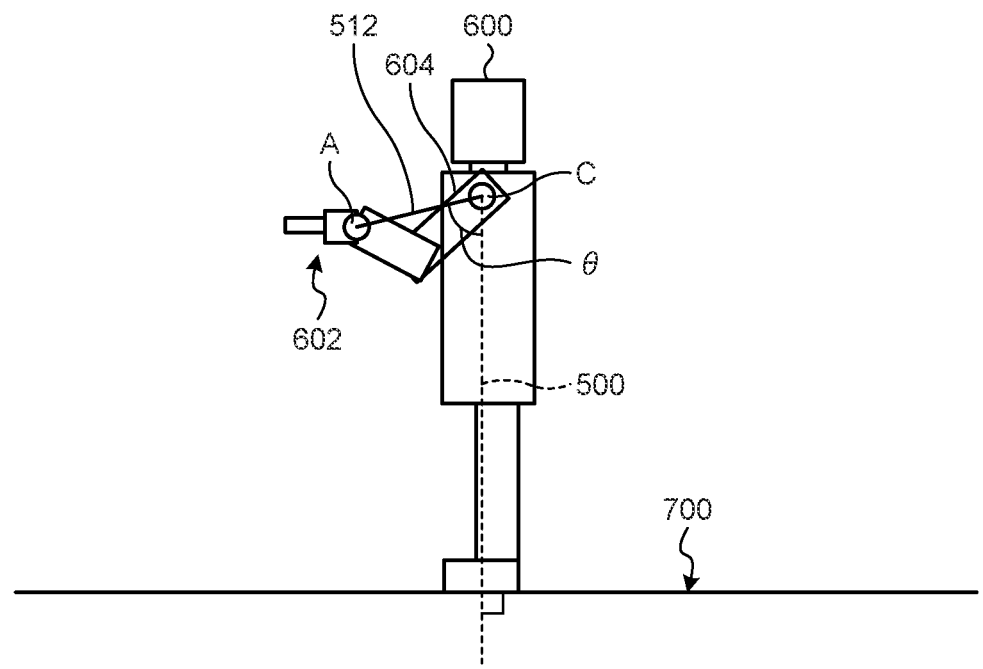
FIG. 9 is an explanatory diagram (part 1) for explaining the operation of a determination unit 112 according to the first embodiment of the present disclosure.
Figure 10:
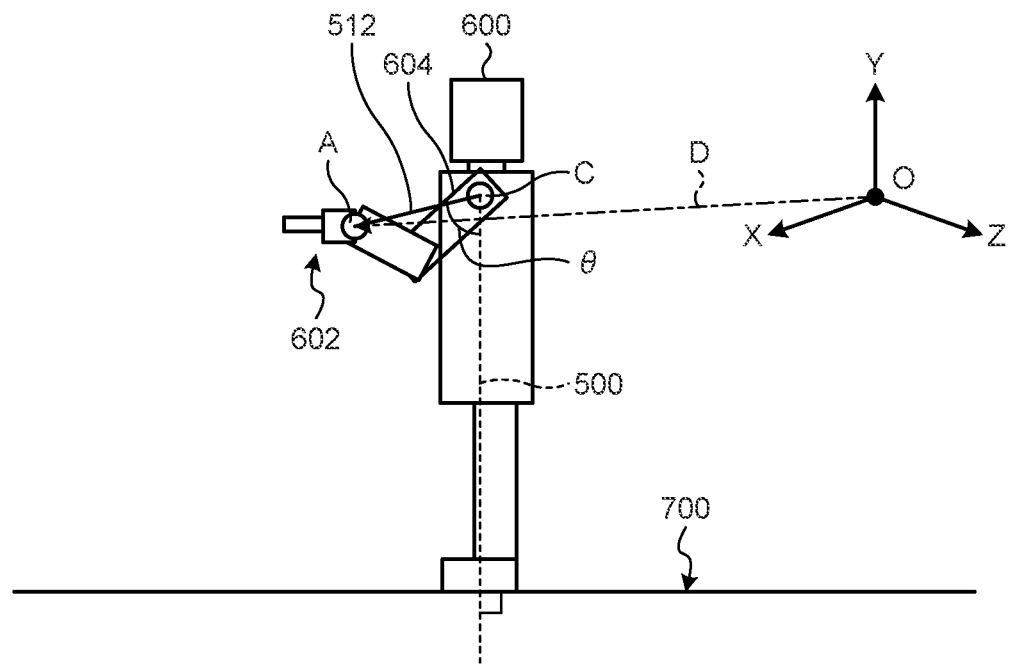
FIG. 10 is an explanatory diagram (part 2) for explaining the operation of the determination unit 112 according to the first embodiment of the present disclosure.
Figure 11:
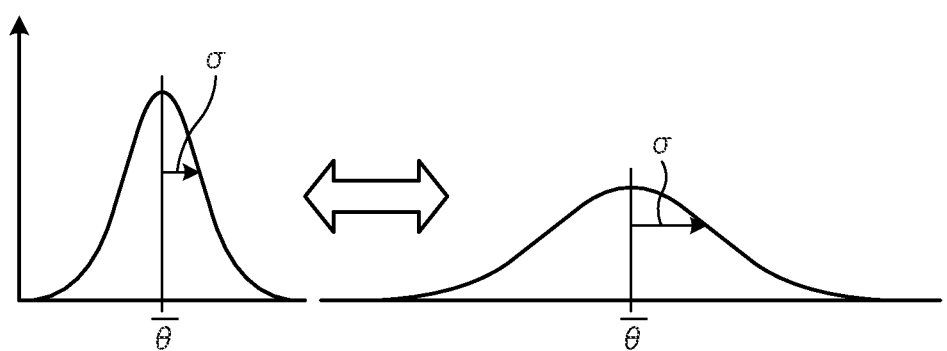
FIG. 11 is an explanatory diagram (part 3) for explaining the operation of the determination unit 112 according to the first embodiment of the present disclosure.

First, a detailed configuration of the above-described detection unit 100a will be described with reference to FIGS. 8 to 11. FIG. 8 is a diagram illustrating a functional configuration of the detection unit 100a according to the first embodiment, and FIGS. 9 to 11 are explanatory diagrams for explaining an operation of the determination unit 112 according to the first embodiment.

As illustrated in FIG. 8, the detection unit 100a mainly includes a distributor-side data acquisition unit 102, a gesture recognition unit 104, a laser point output control unit m, a viewer-side data acquisition unit 108, a detection unit 110, a determination unit 112, and a counter object output control unit 114. Note that FIG. 8 also illustrates a distributor-side data acquisition apparatus 130, a distributor-side output apparatus 160, a viewer-side data acquisition apparatus 230, and a viewer-side output apparatus 260, and in detail, the distributor-side data acquisition apparatus 130 includes the above-described multi-camera system 130a and the like, and the distributor-side output apparatus 160 includes the above-described distributor-side display unit 160a and the like. Further, the viewer-side data acquisition apparatus 230 and the viewer-side output apparatus 260 include the above-described HMD 260a, haptic device 260c, and the like. The functional blocks of the detection unit 100a will be sequentially described below.

(Distributor-Side Data Acquisition Unit 102)

The distributor-side data acquisition unit 102 can acquire at least one piece of sensing data (for example, captured image, motion data, voice, position information, or the like) regarding one or a plurality of artists 600 from the multi-camera system 130a or the like, and output the sensing data to the gesture recognition unit 104 to be described below.

(Gesture Recognition Unit 104)

The gesture recognition unit 104 can recognize a pointing action in which the artist 600 selects the viewer with the finger-pointing gesture on the basis of the above-described sensing data. In detail, for example, the gesture recognition unit 104 recognizes the pointing action in a case where the angle of a corner formed by a line segment (second line segment) 512 (see FIG. 9) connecting a reference point (third reference point) C indicating the position of the base of the arm 604 of the artist 600 corresponding to the finger-pointing gesture and a reference point (first reference point) A indicating the position of the wrist of the hand 602 of the artist 600 and a perpendicular line (first perpendicular line) 500 perpendicularly extending from the reference point C to the floor surface 700 is within a predetermined range (for example, 20° or more) on a plane including the line segment 512 and the perpendicular line 500. Then, the gesture recognition unit 104 outputs the recognition result to a laser point output control unit 106 and the detection unit 110 described below.

(Laser Point Output Control Unit 106)

The laser point output control unit 106 can display a laser point or a beam arrow so that the artist 600 can easily visually recognize the destination pointed by the above-described finger-pointing gesture and can more stably positively indicate the selection destination with the finger-pointing gesture. Specifically, the laser point output control unit 106 can display a beam arrow extending from the fingertip to a predetermined distance along the fingertip of the above-described finger-pointing gesture in the real space where the artist 600 exists. Further, similarly, the laser point output control unit 106 can display the laser point at a position separated a predetermined distance from the fingertip of the above-described finger-pointing gesture along the fingertip of the above-described finger-pointing gesture in the real space where the artist 600 exists. At this time, the laser point output control unit 106 controls a tablet (illustration omitted) or a smartphone (illustration omitted) held by the artist 600, an HMD (illustration omitted) worn by the artist 600, a projector (illustration omitted) installed in the real space where the artist 600 exists to perform display.

(Viewer-Side Data Acquisition Unit 108)

The viewer-side data acquisition unit 108 can acquire at least one piece of sensing data (for example, captured image, motion data, voice, position information, or the like) regarding one or a plurality of viewers from the viewer-side client 200 or distribution data obtained by processing the sensing data, and output the sensing data or distribution data to the detection unit 110 to be described below.

(Detection Unit 110)

The detection unit 110 can detect the viewer selected by the artist 600 with the finger-pointing gesture as the selected object. In detail, the detection unit 110 can detect the selected viewer on the basis of an extension line (first extension line) 520 extending from a line segment (first line segment) 510 connecting a reference point (first reference point) A indicating the position of the wrist of the hand 602 of the artist 600 corresponding to the finger-pointing gesture and a reference point (second reference point) B corresponding to the height of the wrist on a perpendicular line (first perpendicular line) 500 perpendicularly extending from the base (reference point C) of the arm 604 of the artist 600 corresponding to the finger-pointing gesture to the floor surface 700 toward the wrist side. In more detail, the detection unit 110 can detect the viewer corresponding to the point on the extension line 520 as the selected object. Then, the detection unit 110 can output the detection result to the determination unit 112 described below.

(Determination Unit 112)

The determination unit 112 can determine whether the pointing action in which the artist 600 selects the viewer with the finger-pointing gesture satisfies a predetermined stability condition. Then, the determination unit 112 can output the determination result to the counter object output control unit 114 described below.

For example, as illustrated in FIG. 9, the determination unit 112 determines that the pointing action satisfies the stability condition in a case where an angle θ of a corner formed by the line segment (second line segment) 512 connecting the reference point (third reference point) C indicating the position of the base of the arm 604 of the artist 600 corresponding to the finger-pointing gesture and the reference point (first reference point) A indicating the position of the wrist of the hand 602 of the artist 600 and the perpendicular line (first perpendicular line) 500 perpendicularly extending from the reference point C to the floor surface 700 is within a predetermined range within a predetermined time on a plane including the line segment 512 and the perpendicular line 500. In detail, the determination unit 112 acquires the angle θ of the above-described corner a predetermined number of times within a predetermined time (for example, one second), calculates a variance $\sigma^2$ on the basis of the acquired value, and determines that the above-described pointing action satisfies the stability condition when a further calculated standard deviation σ is within a predetermined value.

More specifically, in the present embodiment, for example, the variance $\sigma^2$ and the standard deviation σ are calculated according to Formula (1) described below. Note that, in Formula (1), $\theta_i$ represents an angle acquired a predetermined number of times (i=1 to n), and θ (overlined) represents an average value of $\theta_i$.

$$\sigma^2 = \frac{1}{n}\sum_{i=1}^{n}(\theta_i - \overline{\theta})^2 \qquad (1)$$

$$\sigma = \sqrt{\frac{1}{n}\sum_{i=1}^{n}(\theta_i - \overline{\theta})^2}$$

Alternatively, in the present embodiment, as illustrated in FIG. 10, the determination unit 112 may determine that the pointing action satisfies the stability condition in a case where a distance D from a spatial origin O (virtually set on the real space where the artist 600 exists) to the wrist of the hand 602 of the artist 600 corresponding to the finger-pointing gesture is within a predetermined range within a predetermined time. In detail, the determination unit 112 acquires the above-described distance D a predetermined number of times within a predetermined time, calculates a variance $\sigma^2$ on the basis of the acquired value, and determines that the pointing action satisfies the stability condition when a further calculated standard deviation σ is within a predetermined value.

More specifically, in the present embodiment, the variance $\sigma^2$ and the standard deviation σ can be calculated according to Formula (1) described below. Note that, in Formula (1), $D_i$ represents a distance acquired a predetermined number of times (i=1 to n), and D (overlined) represents an average value of $D_i$.

$$\sigma^2 = \frac{1}{n}\sum_{i=1}^{n}(D_i - \overline{D})^2 \qquad (2)$$

$$\sigma = \sqrt{\frac{1}{n}\sum_{i=1}^{n}(D_i - \overline{D})^2}$$

As illustrated in FIG. 11, in a case where the standard deviation σ is small, the variation in the angle θ or the distance D is small, and in a case where the standard deviation σ is large, the variation in the angle θ or the distance D is large. Therefore, when the calculated standard deviation σ is within the predetermined value, it can be considered that the finger-pointing gesture of the artist 600 stably indicates the selected viewer as intended over the predetermined time. In the present embodiment, by statistically determining whether the finger-pointing gesture of the artist 600 is stable, it is possible to avoid erroneous detection of the finger-pointing gesture or the destination pointed by the finger-pointing gesture, and the robustness of the detection can be further improved.

Note that, in the present embodiment, the determination is not limited to determining whether the stability condition is satisfied using the variance $\sigma^2$ and the standard deviation σ, and the determination may be made using another index or another statistical value.

(Counter Object Output Control Unit 114)

For example, the counter object output control unit 114 can perform communication between a plurality of viewer-side devices (for example, a smartphone, a wearable device, or the like) and an artist 600-side device (for example, a smartphone, a wearable device, or the like), and can interactively connect the selected viewer-side device and the artist 600-side device.

Further, the counter object output control unit 114 can control the viewer-side device, a nearby device (for example, lighting, projector, speaker, or the like), or the like to perform a predetermined operation such as blinking or sound output according to the selected viewer. For example, the counter object output control unit 114 may display virtual objects (predetermined images) having various forms such as text, icons, animation, or the like in the virtual space displayed on the HMD 260a of the selected viewer (VR space sharing). Alternatively, the counter object output control unit 114 may control a projector (illustration omitted) installed in the real space where the selected viewer exists, and superimpose and display virtual objects (predetermined images) having various forms such as text, icons, animation, or the like on the viewer (AR space sharing).

Moreover, in the present embodiment, the counter object output control unit 114 may perform control, for example, to delete, enlarge, reduce, or change an image displayed on a display (illustration omitted), which is a selected object, or to reproduce or stop content such as text, an image, or the like. Further, the counter object output control unit 114 may, for example, reproduce or stop the sound of a speaker (illustration omitted) or change the direction of the sound output of the speaker. Further, the counter object output control unit 114 may operate, for example, a robot (illustration omitted) as a selected object.

Note that, in the present embodiments, the functional blocks included in the detection unit 100*a* are not limited to the functional blocks illustrated in FIG. 8.

4.2 Information Processing Method

Figure 12:
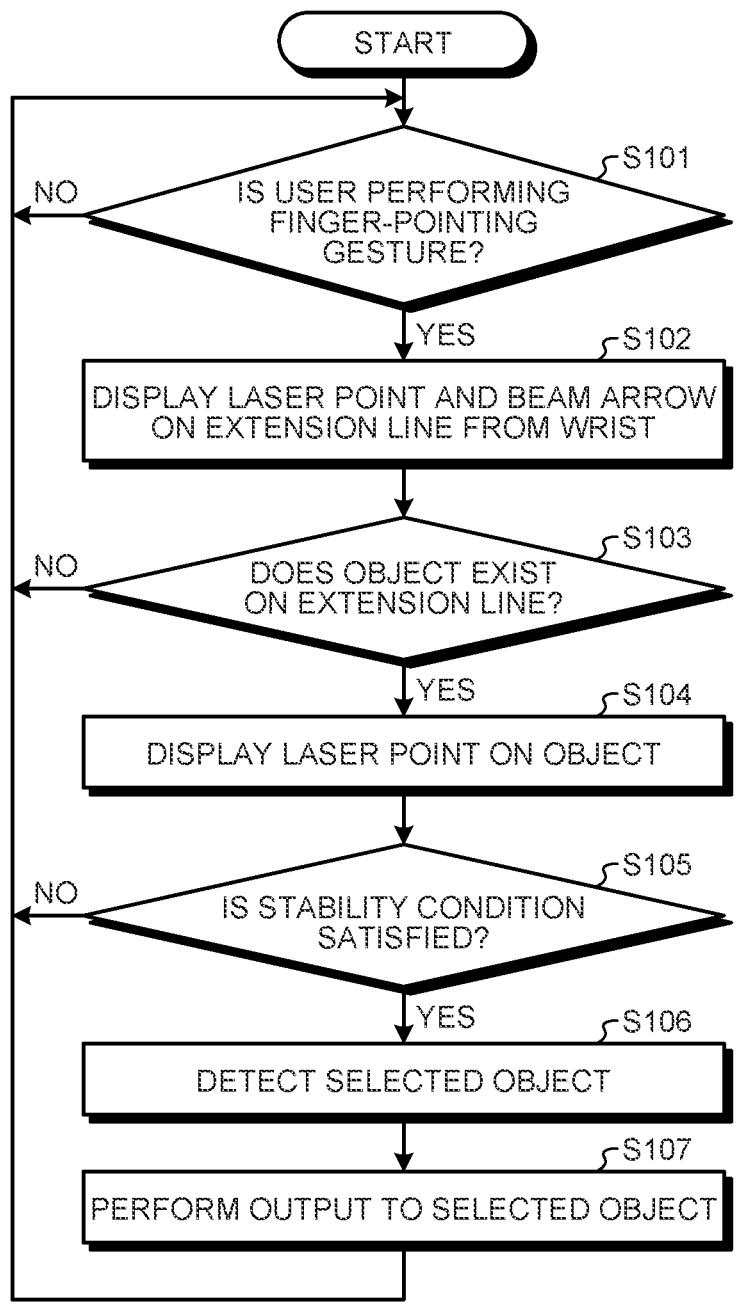
FIG. 12 is a flowchart diagram of an information processing method according to the first embodiment of the present disclosure.
Figure 13:
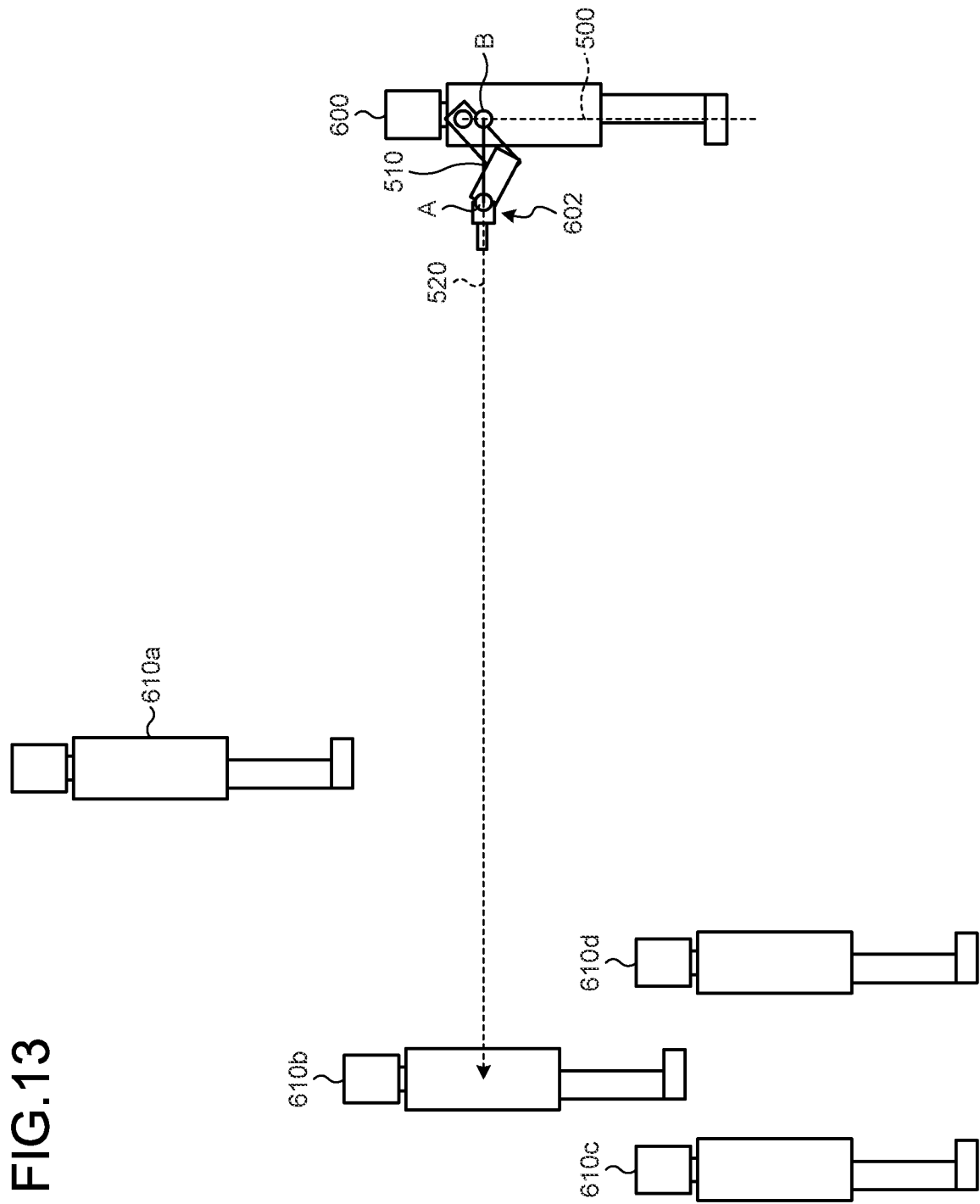
FIG. 13 is an explanatory diagram for explaining the first embodiment of the present disclosure.

The functional blocks of the detection unit 100*a* according to the present embodiment have been described in detail above. Next, the information processing method according to the present embodiment will be described with reference to FIGS. 12 and 13. FIG. 12 is a flowchart diagram of the information processing method according to the present embodiment, and FIG. 13 is an explanatory diagram for explaining the present embodiment. As illustrated in FIG. 12, the information processing method according to the present embodiment includes a plurality of steps from Steps S101 to S107. Hereinafter, details of each step included in the information processing method according to the present embodiment will be described.

First, the detection unit 100*a* determines whether the artist 600 is performing the pointing action of selecting a viewer with the finger-pointing gesture on the basis of at least one piece of sensing data related to one or a plurality of artists 600 (Step S101). The detection unit 100*a* proceeds to Step S102 in a case where the artist 600 is performing the finger-pointing gesture (Step S101: Yes), and returns to the processing of Step S101 described above in a case where the artist 600 is not performing the finger-pointing gesture (Step S101: No).

The detection unit 100*a* displays a laser point and a beam arrow so that the artist 600 can easily visually recognize the destination pointed by the above-described finger-pointing gesture and can more stably positively indicate the selection destination with the finger-pointing gesture (Step S102).

As illustrated in FIG. 13, the detection unit 100*a* determines whether there is a viewer (object) 610 corresponding to a point on the above-described extension line 520 (Step S103). For example, in the present embodiment, the detection unit 100*a* acquires the relative positional relationship between the artist 600 and the image of the viewer 610 in the virtual space expressed on the artist 600 side on the basis of the position information of the artist 600 and the viewer 610. Then, as illustrated in FIG. 13, the detection unit 100*a* can determine whether the viewer (or, coordinates corresponding to the viewer) 610 exists on the above-described extension line 520 on the basis of the relative positional relationship. Then, the detection unit 100*a* proceeds to Step S104 in a case where a viewer 610*b* corresponding to the point on the extension line 520 exists (Step S103: Yes), and returns to the processing of Step S101 described above in a case the viewer 610 corresponding to the point on the extension line 520 does not exist (Step S103: No).

Moreover, the detection unit 100*a* controls the HMD 260*a* or the like worn by the selected viewer (object) 610 to continue display of the laser point (illustration omitted) or the like (Step S104).

Next, the detection unit 100*a* determines whether the pointing action in which the artist 600 selects the viewer 610 with the finger-pointing gesture satisfies the predetermined stability condition (Step S105). Then, the detection unit 100*a* proceeds to Step S106 in a case where the predetermined stability condition is satisfied (Step S105: Yes), and returns to the processing of Step S101 described above in a case where the predetermined stability condition is not satisfied (Step S105: No).

Then, the detection unit 100*a* detects the viewer (object) 610 selected by the artist 600 with the finger-pointing gesture as the selected object (Step S106).

Next, the detection unit 100*a* interactively connects the selected viewer 610-side device and the artist 600-side device. Moreover, the detection unit 100*a* controls the HMD 260*a* or the like worn by each viewer 610, superimposes and displays the virtual object on the selected viewer 610 (Step S107). Then, the detection unit 100*a* returns to the processing of Step S101 described above.

As described above, in the present embodiment, by detecting the reference point A and the reference point C, the viewer 610 selected by the artist 600 with the finger-pointing gesture is selected. In detail, according to the present embodiment, since the reference point A indicating the position of the wrist of the hand 602 of the artist 600 and the reference point C indicating the position of the base of the arm 604 of the artist 600 corresponding to the finger-pointing gesture can be easily detected, the viewer 610 selected by the artist 600 by the method described above can be easily selected. Moreover, in the present embodiment, the finger-pointing gesture of performing finger-pointing toward the selected viewer 610 is adopted as the selection motion of the artist 600, and as described above, the finger-pointing gesture is a motion performed to point out a selected object or the like in daily life, and is a natural and intuitive motion, and therefore, there is no burden on the artist 600. That is, according to the present embodiment, the viewer 610 selected by a natural and intuitive selection motion by the artist 600 can be accurately selected.

4.3 First Modification

Figure 14:
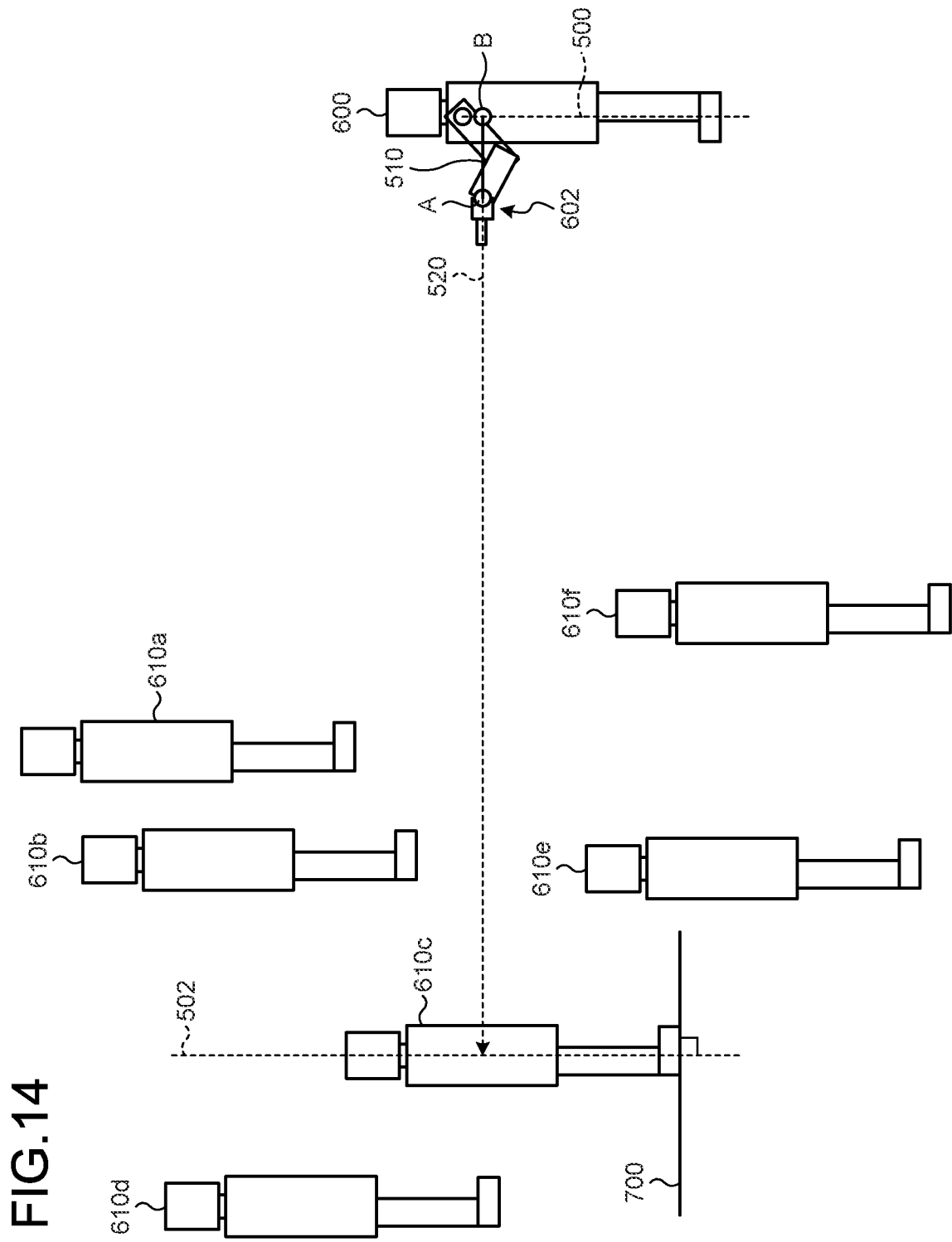
FIG. 14 is an explanatory diagram for explaining a first modification of the first embodiment of the present disclosure.
Figure 15:
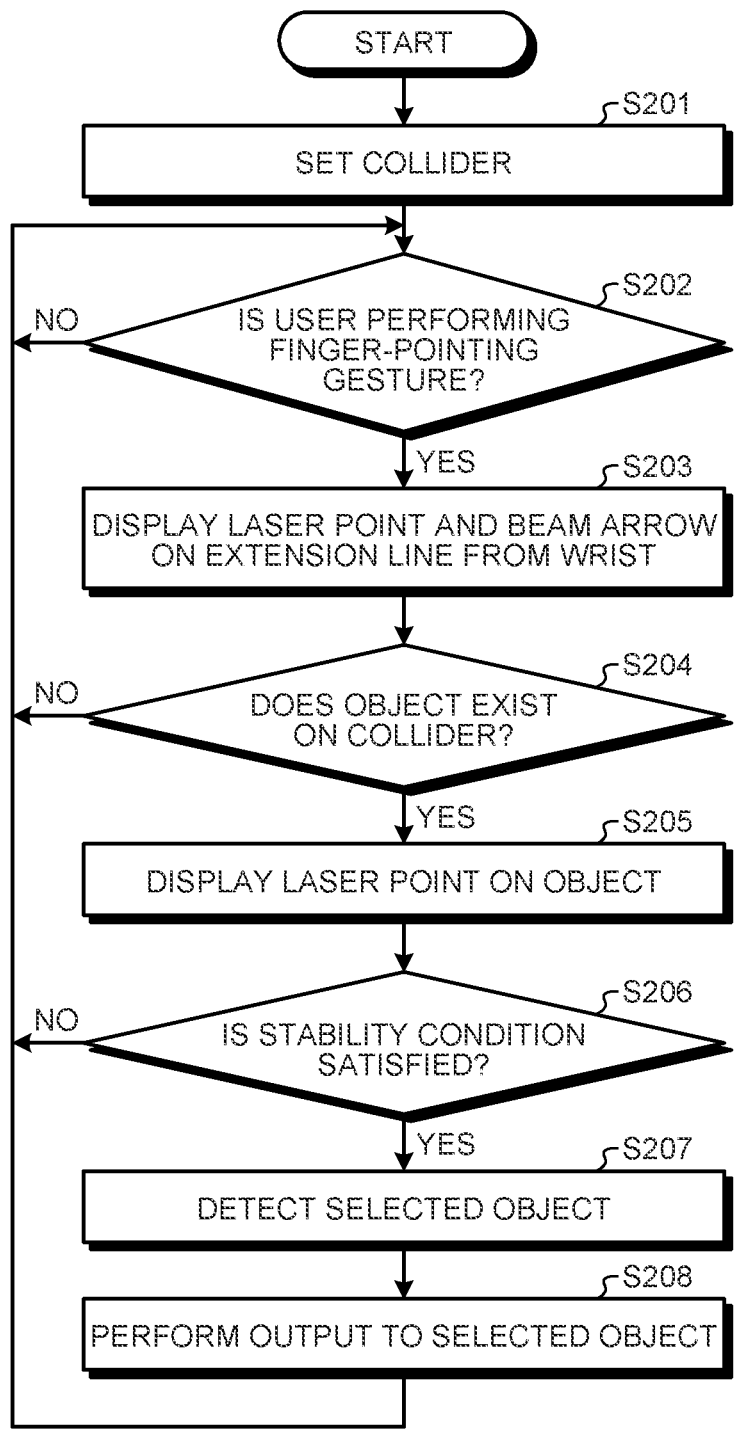
FIG. 15 is a flowchart diagram of an information processing method according to the first modification of the first embodiment of the present disclosure.

In the first embodiment described above, the viewer 610 selected by the artist 600 is detected on the basis of whether or not the viewer 610 corresponding to the point on the extension line 520 exists. However, the present embodiment is not limited to the detection by such a method, and another method can be performed. Therefore, in the following, a method of detecting the selected viewer 610 used in another method will be described as a first modification of the present embodiment with reference to FIGS. 14 and 15. FIG. 14 is an explanatory diagram for explaining the first modification of the present embodiment, and FIG. 15 is a flowchart diagram of the information processing method according to the first modification of the present embodiment.

In the present modification, similarly to the first embodiment, the detection unit 100*a* acquires the extension line (first extension line) 520 extending from the line segment (first line segment) 510 connecting the reference point (first reference point) A indicating the position of the wrist of the hand 602 of the artist 600 (user) corresponding to the finger-pointing gesture and the reference point (second reference point) B corresponding to the height of the wrist on the perpendicular line (first perpendicular line) 500 perpendicularly extending from the base (reference point C) of the arm 604 of the artist 600 corresponding to the finger-pointing gesture to the floor surface 700 toward the wrist side. Moreover, in the present modification, as illustrated in FIG. 14, a rectangular collider having a long side extending along a perpendicular line (second perpendicular line) 502 is virtually installed on the above-described perpendicular line 502 extending perpendicularly from a point located on the extension line 520 to the floor surface 700. Then, in the present modification, a viewer 610c positioned in the collider is detected as the selected object. Note that, in the present modification, the size of the collider can be appropriately changed according to the size and purpose of the selected object.

According to the present modification described above, it is possible to easily select the viewer 610 selected by the artist 600 with high accuracy and without omission by virtually setting the above-described collider on the real space where the viewer 610 exists and detecting the viewer 610 positioned in the collider.

Next, the information processing method according to the present modification will be described with reference to FIG. 15. As illustrated in FIG. 15, the information processing method according to the present modification includes a plurality of steps from Steps S201 to S208. Steps S202 and S203 of the present modification perform the same processing as the processing of Steps S101 and S102 according to the first embodiment illustrated in FIG. 12. Moreover, Steps S205 to S208 of the present modification perform the same processing as the processing of Steps S104 to S107 according to the first embodiment illustrated in FIG. 12. Therefore, in the following description, only Steps S201 and S204 different from those of the above-described first embodiment will be described, and description of the other steps common to the first embodiment will be omitted.

The detection unit 100a sets the detection mode of the selected object (viewer) 610 to the mode using the collider virtually installed on the perpendicular line 502 perpendicularly extending from the point located on the extension line 520 to the floor surface 700 as described above (Step S201).

As illustrated in FIG. 14, the detection unit 100a determines whether a viewer (object) 610 exists in the above-described collider (Step S204). Then, the detection unit 100a proceeds to Step S205 in a case where the viewer 610c exists in the collider (Step S204: Yes), and returns to the processing of Step S202 described above in a case the viewer 610 does not exist in the collider (Step S204: No).

4.4 Second Modification

Figure 16:
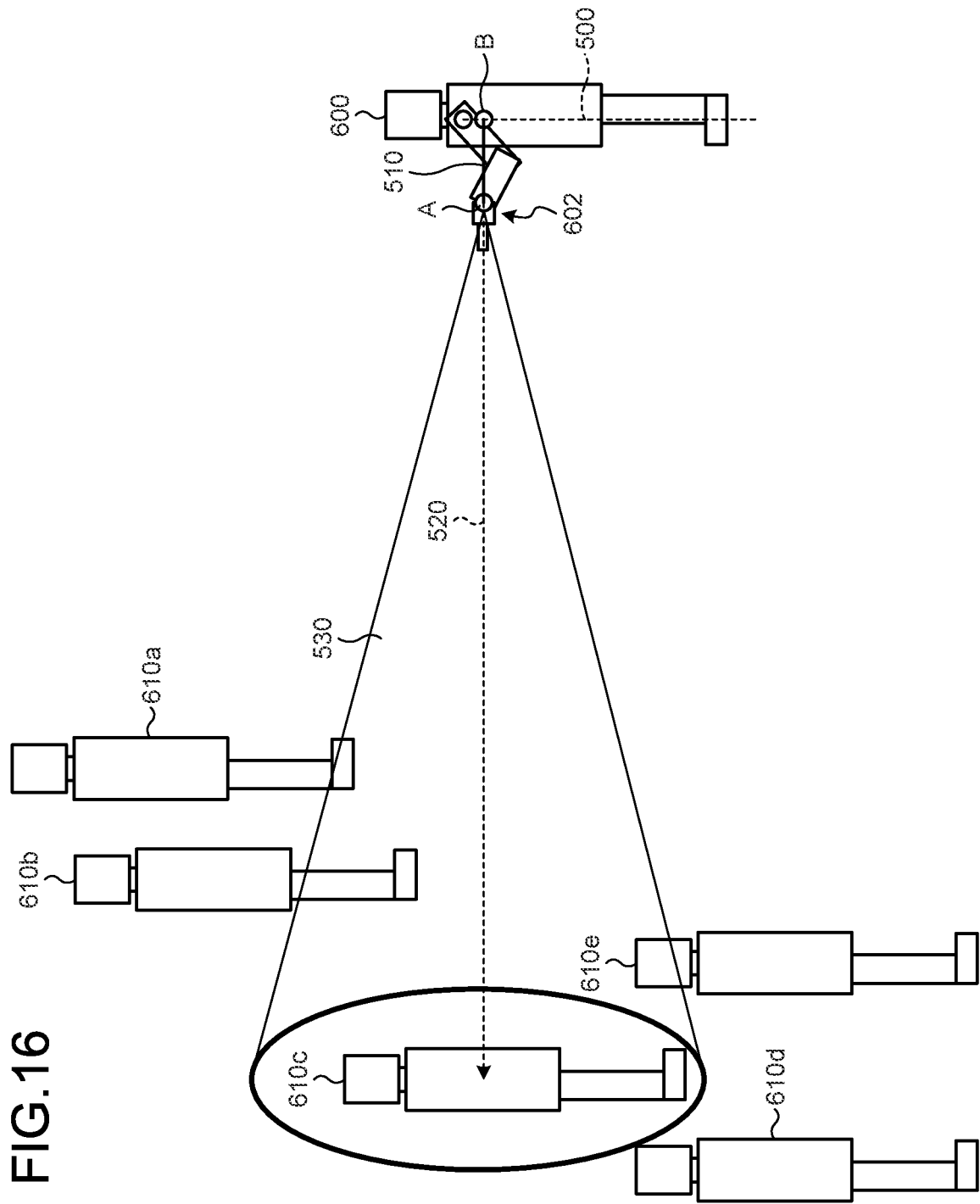
FIG. 16 is an explanatory diagram for explaining a second modification of the first embodiment of the present disclosure.

The detection of the selected viewer 610 can be modified as described below. Therefore, a method of detecting the selected viewer used in another method will be described as a second modification of the present embodiment with reference to FIG. 16. FIG. 16 is an explanatory diagram for explaining the second modification of the present embodiment.

In the present modification, similarly to the first embodiment, the detection unit 100a acquires the extension line (first extension line) 520 extending from the line segment (first line segment) 510 connecting the reference point (first reference point) A indicating the position of the wrist of the hand 602 of the artist 600 corresponding to the finger-pointing gesture and the reference point (second reference point) B corresponding to the height of the wrist on the perpendicular line (first perpendicular line) 500 perpendicularly extending from the base (reference point C) of the arm 604 of the artist 600 corresponding to the finger-pointing gesture to the floor surface 700 toward the wrist side. Moreover, in the present modification, as illustrated in FIG. 16, the viewer 610c included in a space 530 having a conical shape having the extension line 520 as an axis and the reference point A as a vertex is detected as an object. Note that, in the present modification, the length of the axis of the above-described cone and the size of the diameter of the bottom surface may be dynamically changed according to the detection situation or the like of the selected viewer 610.

According to the present modification, it is possible to easily select the viewer 610 selected by the artist 600 with high accuracy and without omission by virtually setting the above-described space 530 having a conical shape on the real space where the viewer 610 exists and detecting the viewer 610 included in the space 530 having a conical shape.

4.5 Third Modification

Figure 17:
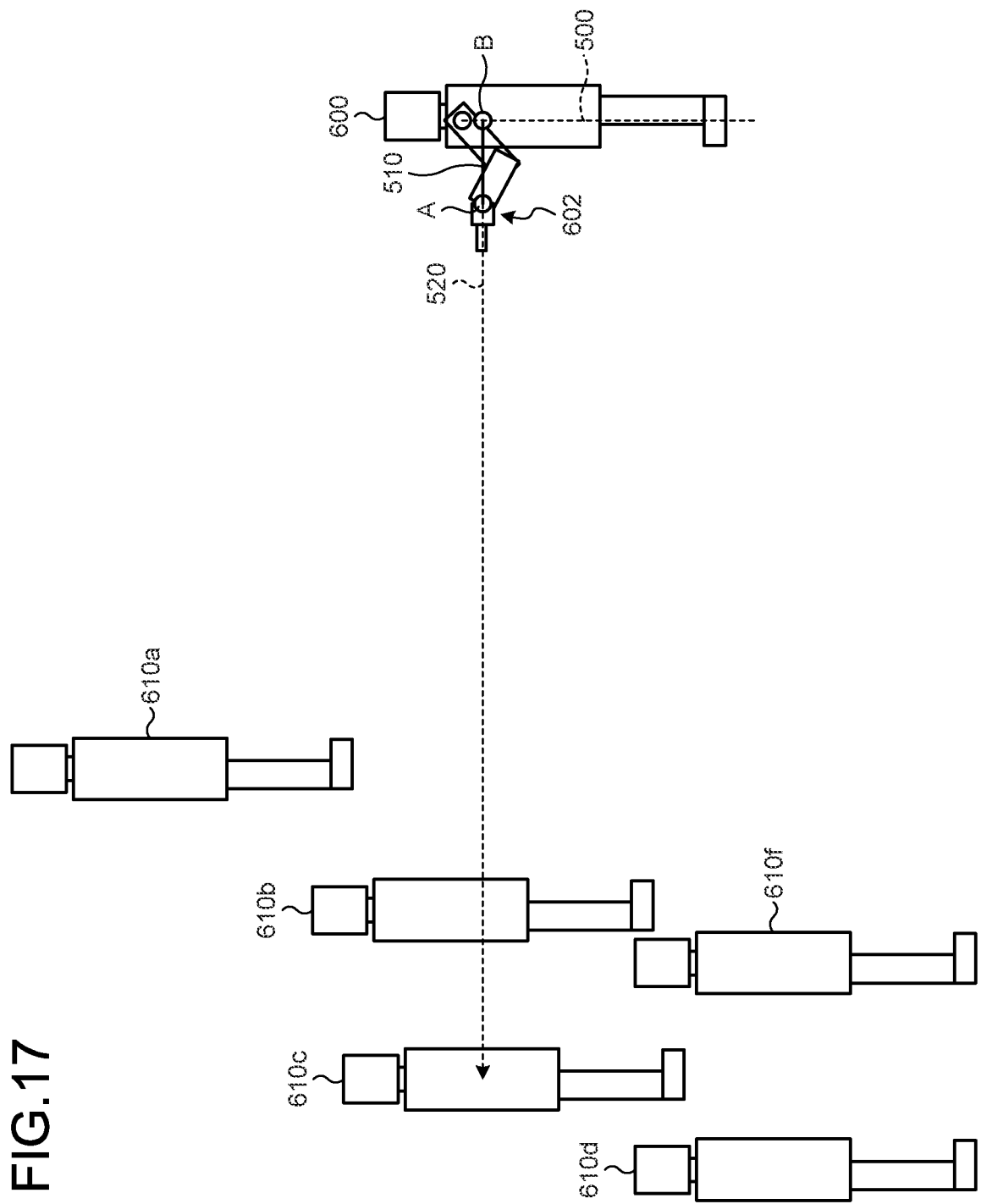
FIG. 17 is an explanatory diagram for explaining a third modification of the first embodiment of the present disclosure.

In the first embodiment and each modification described above, one viewer (object) 610 is detected on the basis of the extension line 520. However, the present embodiment is not limited to detecting one viewer 610, but may detect a plurality of viewers 610. Therefore, in the following, an example of detecting the plurality of viewers 610 will be described as a third modification of the present embodiment with reference to FIG. 17. FIG. 17 is an explanatory diagram for explaining the third modification of the present embodiment.

First, in the present modification, as illustrated in FIG. 17, the detection unit 100a detects a first viewer 610b corresponding to the point on the extension line 520 as the selected object. Then, the detection unit 100a performs labeling to indicate that the detected viewer 610b has been selected, and acquires information of the viewer 610b. Next, the detection unit 100a detects another viewer 610c corresponding to the point on the extension line 520, which is located behind the viewer 610b and is hidden when viewed from the image of the artist 600. Then, the detection unit 100a detects, labels, and acquires information of the viewer 610c, as in the case of the viewer 610b. By repeating such an operation, a plurality of viewers 610 can be selected in the present modification.

5. SECOND EMBODIMENT

5.1 Detection Mode

Figure 18:
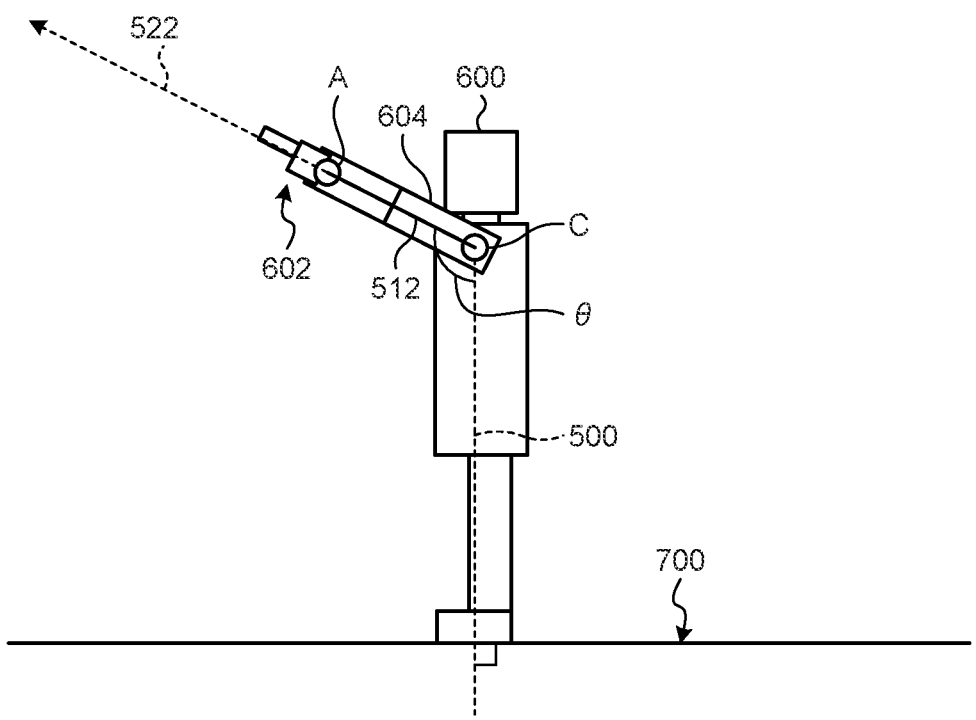
FIG. 18 is an explanatory diagram (part 1) for explaining the second embodiment of the present disclosure.
Figure 19:
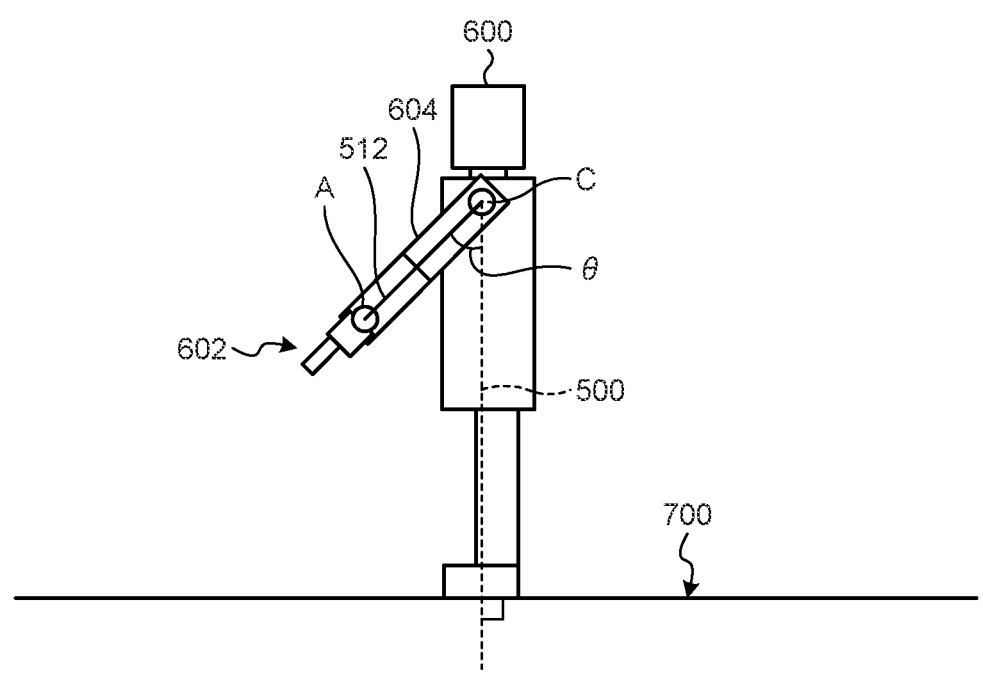
FIG. 19 is an explanatory diagram (part 2) for explaining the second embodiment of the present disclosure.

In the embodiments of the present disclosure, the detection mode for detecting the selected viewer 610 may be dynamically changed according to the state of the finger-pointing gesture of the artist 600. Therefore, an embodiment for switching the detection mode will be described as the second embodiment of the present disclosure with reference to FIGS. 9, 18, and 19. FIGS. 18 and 19 are explanatory diagrams for explaining the second embodiment of the present disclosure.

In the present embodiment, for example, the detection mode is switched between three detection modes. In detail, in the present embodiment, as illustrated in FIG. 9, the detection mode is switched according to the angle θ of the corner formed by the line segment (second line segment) 512 connecting the reference point (third reference point) C indicating the position of the base of the arm 604 of the artist (user) 600 corresponding to the finger-pointing gesture and the reference point (first reference point) A indicating the position of the wrist of the hand 602 of the artist 600 corresponding to the finger-pointing gesture and the perpendicular line (first perpendicular line) 500 perpendicularly extending from the reference point C to the floor surface 700 on a plane including the line segment 512 and the perpendicular line 500.

The relationship between the above-described angle θ and the detection mode in the present embodiment can be summarized, for example, in Table 1 below.

TABLE 1

| Detection mode | Angle θ | State |
|---|---|---|
| 1 | 20° ≤ θ ≤ 90° | Pointing state |
| 2 | 90° < θ ≤ 180° | Pointing state |
| 3 | −180° < θ < 20° | Non-pointing state |

In detail, for example, as illustrated in FIG. 9, in a case where the angle θ is 200 (first angle) or more and 90° (second angle) or less, the viewer 610 corresponding to the point on the extension line (first extension line) 520 is detected as the selected object as described in the first embodiment (first detection mode).

Further, for example, as illustrated in FIG. 18, when the angle θ is larger than 90° (second angle), the detection is performed in a second detection mode. In the second detection mode, as illustrated in FIG. 18, the viewer 610 corresponding to the point on an extension line (second extension line) 522 extending from the line segment (second line segment) 512 toward the wrist side is detected as the selected object. For example, when the angle θ is larger than 90°, it is conceivable that the artist 600 wants to point out the viewer 610 located above the artist 600 with the finger-pointing gesture. Therefore, in the present embodiment, in order to detect the viewer 610 selected by the artist 600 by reflecting such intention of the artist 600, detection is performed in the second detection mode different from the first detection mode.

Moreover, for example, as illustrated in FIG. 19, when the angle θ is smaller than 20° (first angle), a third detection mode that does not detect the selected object is performed. For example, when the angle θ is smaller than 20°, it is conceivable that the artist 600 is not intended to point out the selected viewer 610 with the finger-pointing gesture. Therefore, in the present embodiment, the selected object is not detected in order to reflect the intention of the artist 600.

As described above, according to the present embodiment, by switching the detection mode according to the angle θ of the corner formed by the line segment 512 and the perpendicular line 500, it is possible to reflect the intention of the artist 600 so as to select or not select the viewer 610 selected by the artist 600. Note that the specific numerical values of the angle described in the above description are merely an example, and in the present embodiment, the numerical value is not limited to the above numerical values, and the value serving as the threshold value is preferably selected so as to more reflect the intention of the artist 600.

5.2 Information Processing Method

Figure 20:
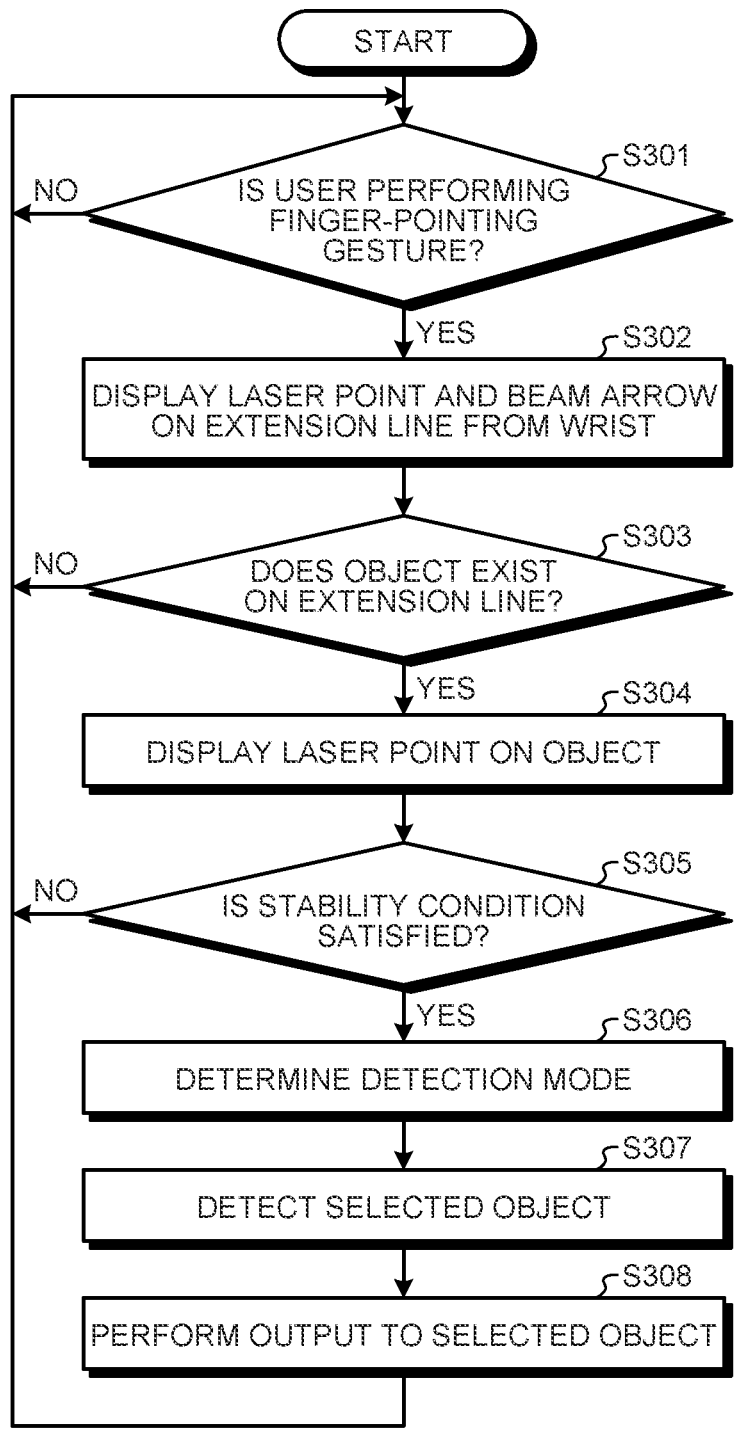
FIG. 20 is a flowchart diagram of an information processing method according to the second embodiment of the present disclosure.

Next, the information processing method according to the present embodiment will be described with reference to FIG. 20. FIG. 20 is a flowchart diagram of the information processing method according to the present embodiment. As illustrated in FIG. 20, the information processing method according to the present embodiment includes a plurality of steps from Steps S301 to S308. Steps S301 to S305 of the present embodiment perform the same processing as the processing of Steps S101 and S105 according to the first embodiment illustrated in FIG. 12. Moreover, Steps S307 and S308 of the present embodiment perform the same processing as the processing of Steps S106 and S107 according to the first embodiment illustrated in FIG. 12. Therefore, in the following description, only Step S306 different from those of the above-described first embodiment will be described, and description of the other steps common to the first embodiment will be omitted.

The detection unit 100a determines the detection mode according to the angle θ of the corner formed by the line segment 512 and the perpendicular line 500 (Step S306).

As described above, according to the present embodiment, by switching the detection mode according to the angle θ of the corner formed by the line segment 512 and the perpendicular line 500, it is possible to reflect the intention of the artist 600 so as to select or not select the viewer 610 selected by the artist 600.

6. EXAMPLES

The first and second embodiments of the present disclosure have been described above. Next, examples of the present embodiments will be described more specifically with reference to specific examples. Note that the examples described below are merely examples of the first and second embodiments, and the first and second embodiments are not limited to the examples described below.

6.1 First Example

Figure 21:
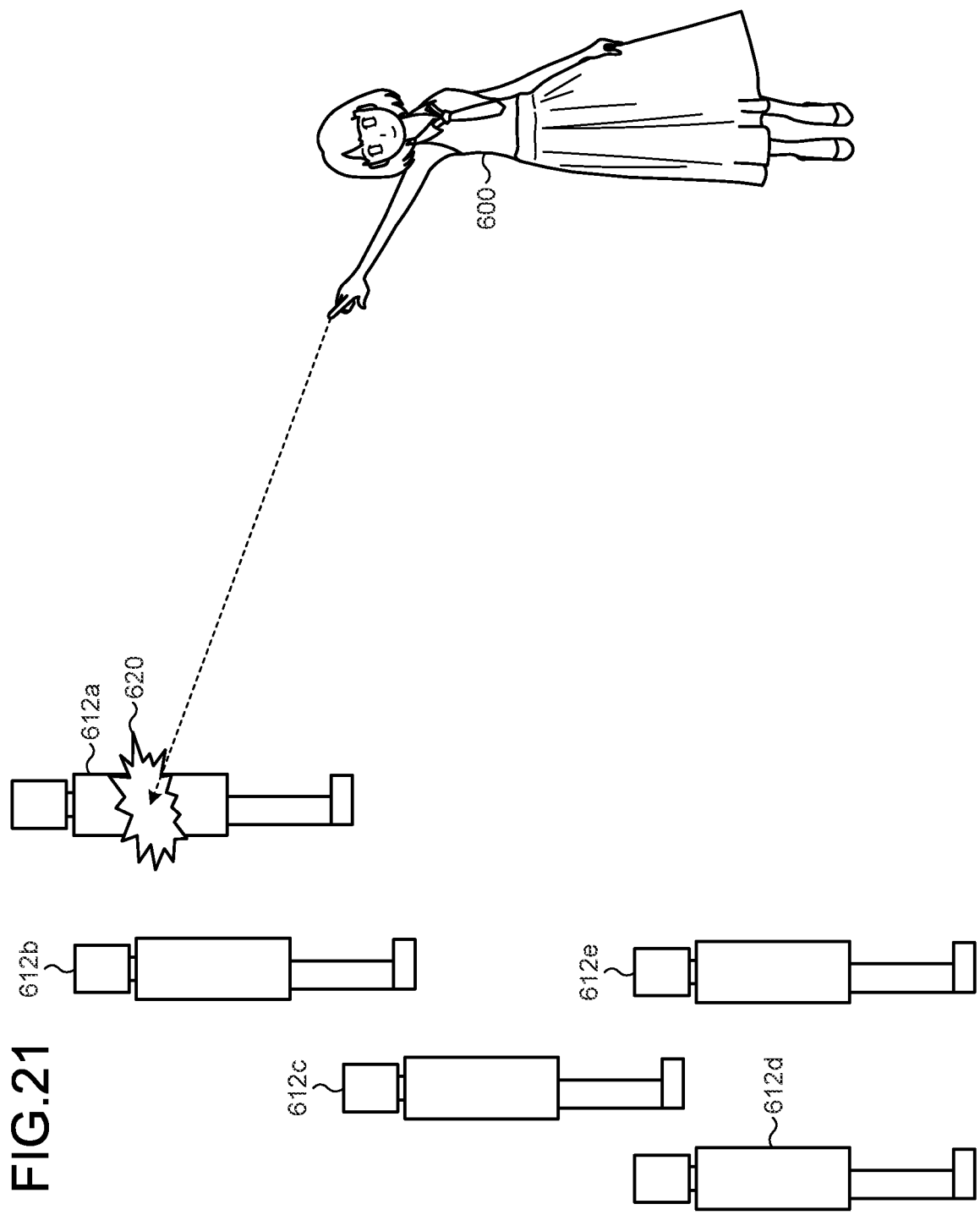
FIG. 21 is an explanatory diagram for explaining a first example of the embodiment of the present disclosure.

First, a first example will be described with reference to FIG. 21. The first example is an example of VR space sharing, and FIG. 21 is an explanatory diagram for explaining the first example of the embodiments of the present disclosure. In the present example, the artist 600 and the viewer 610 exist in different real spaces, and FIG. 21 illustrates the real space where the artist 600 exists. In the real space, it is assumed that avatars (stereoscopic CG images) 612a to 612e corresponding to the viewers 610 are displayed while maintaining the relative positional relationship between the live-action volumetric of the artist 600 displayed in the virtual space on the viewer 610 side and each viewer 610. Moreover, it is assumed that a sound sung by the artist 600 is also distributed in the virtual space on the viewer 610 side together with the live-action volumetric of the artist 600 performing the performance.

Then, in the present example, the artist 600 selects the avatar 612a corresponding to the viewer 610 with which to interact with the finger-pointing gesture, so that the interaction between the artist 600 and the viewer 610 corresponding to the avatar 612a becomes possible. At this time, a laser point display 620 (virtual object) may be displayed on the selected avatar 612a to positively indicate that it is being selected, and the shape, color, pattern, and the like of the avatar 612a may change so as to positively indicate that it is being selected.

Note that, in the present example, a robot (real object) (illustration omitted) arranged in the real space or virtual space where the artist 600 exists may be used instead of the displayed avatar 612, and in this case, the selected robot can move or perform a predetermined motion. For example, a plurality of robots may move or form a predetermined shape like a mass game on the virtual space according to the fingertip gesture of the artist.

6.2 Second Example

Figure 22:
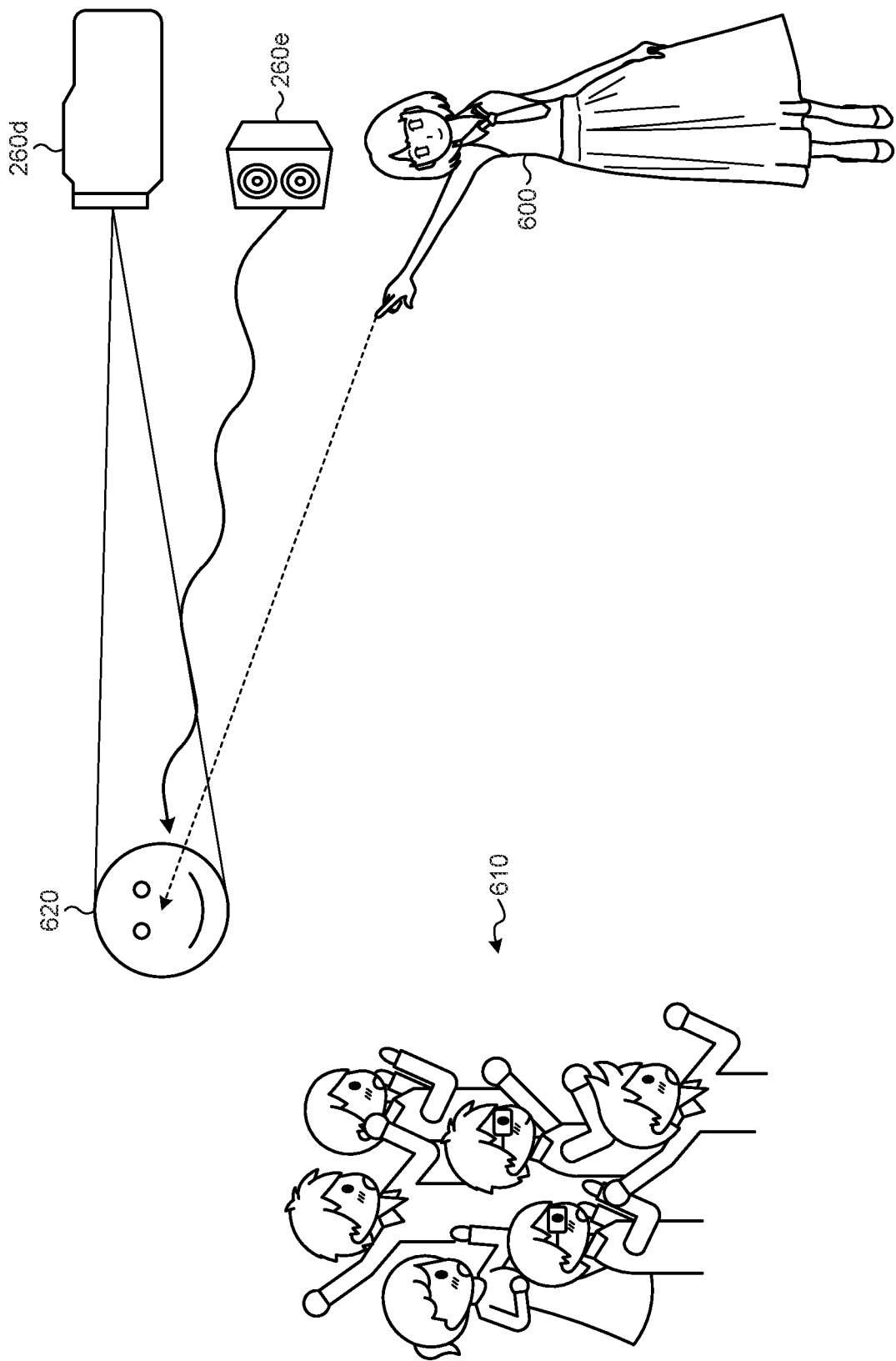
FIG. 22 is an explanatory diagram for explaining a second example of the embodiment of the present disclosure.

Next, a second example will be described with reference to FIG. 22. The second example is an example of AR space sharing, and FIG. 22 is an explanatory diagram for explaining the second example of the embodiments of the present disclosure. In the present example, the artist 600 performing the performance (for example, dance or the like) and the viewer 610 exist in the same real space, and FIG. 21 illustrates the real space.

Then, in the present example, the laser point display 620 is displayed by a projector 260d on a wall or the like pointed by the artist 600 with the finger-pointing gesture. Moreover, in the present example, a speaker 260e outputs a predetermined sound toward the place where the laser point display 620 is displayed. At this time, the directivity of the sound output of the speaker 260e may be controlled to output a predetermined sound toward the place where the laser point display 620 is displayed, or the position of the speaker 260e having directivity may be moved to output a predetermined sound toward the place where the laser point display 620 is displayed. Moreover, in the present example, as the pointing direction of the fingertip gesture of the dancing artist moves, the position at which the laser point display 620 is displayed may move, the laser point display 620 may change, the output destination of the sound may move, or the output sound may change.

In the present example, the viewer can not only directly view the performance of the artist 600 but also simultaneously enjoy the content (display and sound) provided by the finger-pointing gesture of the artist 600.

Further, in the present example, on the basis of motion data from an IMU (illustration omitted) or the like worn by each viewer 610, the synchronousness of the movement of the plurality of viewers 610 (the fluctuation timing of a height component vector of arm raising motion, or the like) may be detected, and the display form (for example, particle display or the like) or the like of the laser point display 620 may be changed according to the level of the synchronousness. Further, in a case where the synchronousness is high, predetermined display (an image in which the artist 600 performs a predetermined motion) or the like may be additionally performed. Moreover, in the present example, a captured image, motion data, or the like of the artist 600 or the viewer 610 may be stored, and the content may be re-edited (for example, switching of the background or the like) using the stored data.

6.3 Third Example

Figure 23:
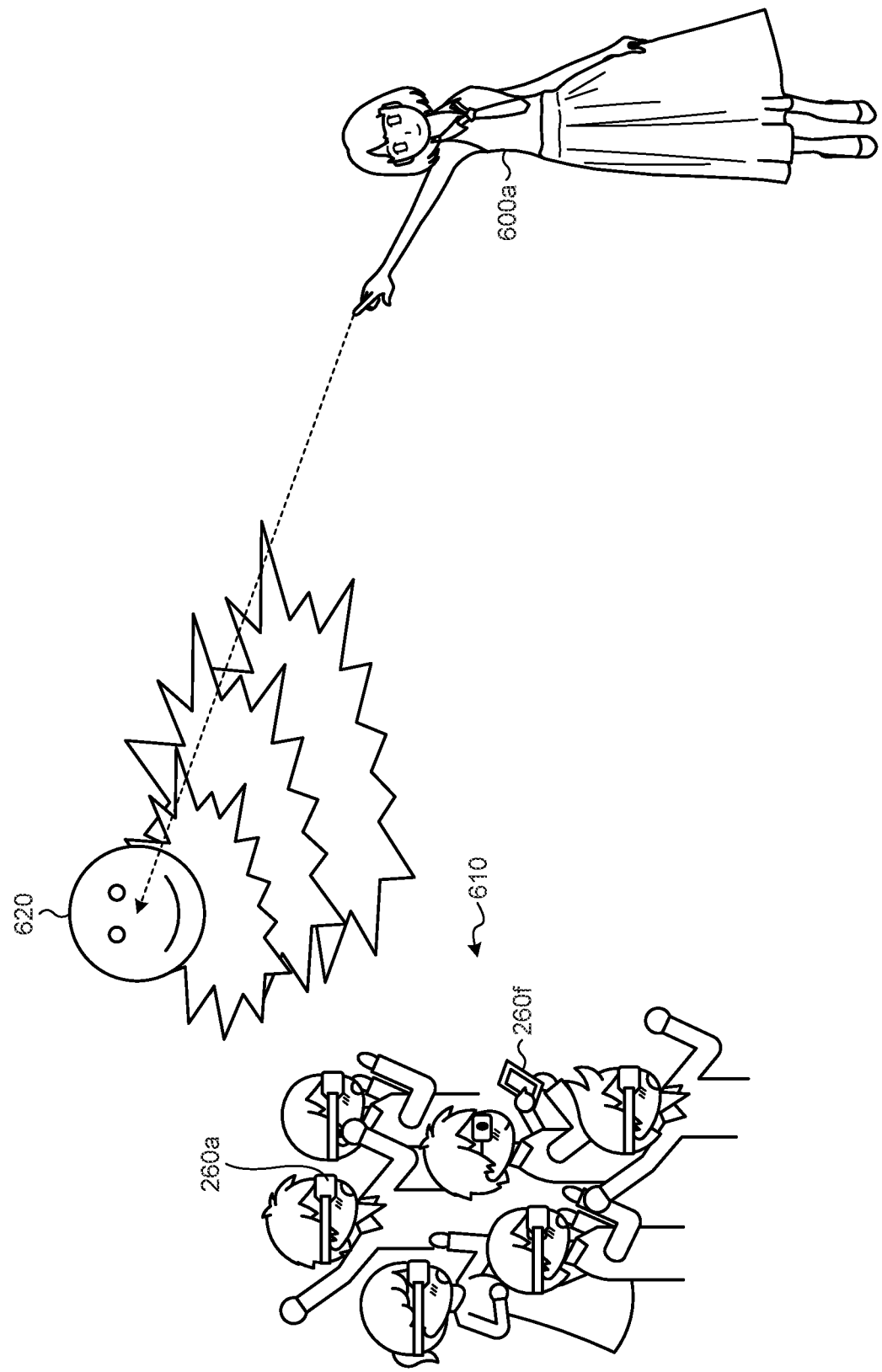
FIG. 23 is an explanatory diagram for explaining a third example of the embodiment of the present disclosure.

Next, a third example will be described with reference to FIG. 23. The third example is an example of VR space sharing, and FIG. 23 is an explanatory diagram for explaining the third example of the embodiments of the present disclosure. In the present example, the artist 600 and the viewer 610 exist in different real spaces. FIG. 23 (in detail, the right side of FIG. 23) illustrates a VR image viewed by the viewer 610 using the HMD 260a or a smartphone 260f. The VR image includes a live-action volumetric 600a of the artist 600 displayed in the virtual space on the viewer 610 side, and the laser point display 620 displayed on a wall on the virtual space pointed by the artist 600 with the finger-pointing gesture.

Note that, in the present example, the above-described laser point display 620 may be displayed on the virtual space shared between the artist 600 and the viewer 610. Further, the above-described laser point display 620 may be changed in pattern, color, or the like according to a change in the finger-pointing gesture of the artist 600, or may be animation in which ripples change according to a change in the finger-pointing gesture. Moreover, in the present example, in a case where the artist 600 selects the viewer 610 with which to interact is performed, only the selected viewer 610 may be allowed to visually recognize the live-action volumetric 600a of the artist 600, or only the live-action volumetric 600a visually recognized by the selected viewer 610 may be enlarged, reduced, or changed. Further, in the present example, the sound content by the artist 600 may be provided to the viewer 610 via the HMD 260a or the smartphone 260f. In the present example, images and sounds of the performance of the artist 600 existing in the real space different from that of the viewer 610 can be simultaneously provided to the plurality of viewers 610.

6.4 Fourth Example

Figure 24:
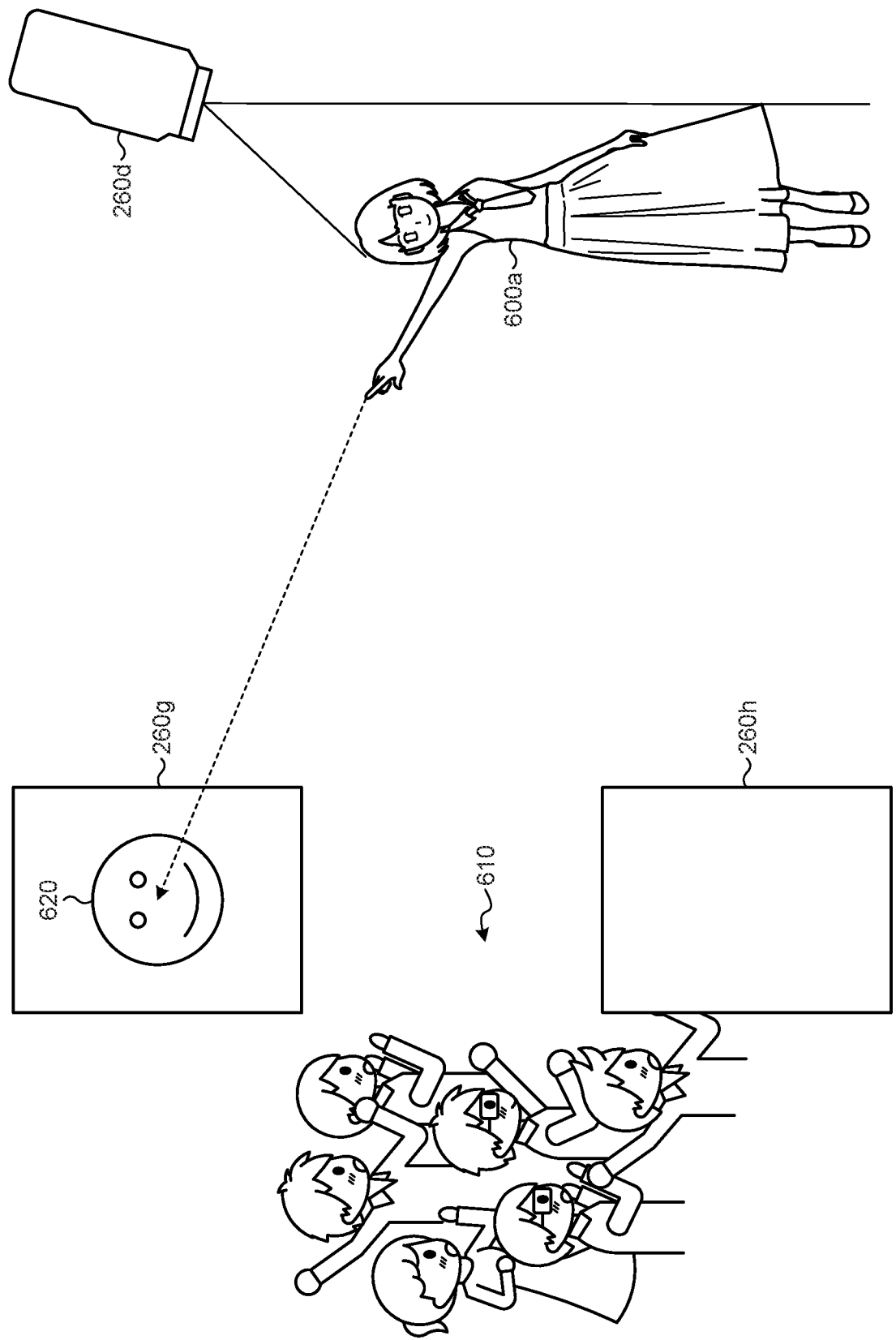
FIG. 24 is an explanatory diagram for explaining a fourth example of the embodiment of the present disclosure.

Next, a fourth example will be described with reference to FIG. 24. The fourth example is an example of AR space sharing, and FIG. 24 is an explanatory diagram for explaining the fourth example of the embodiments of the present disclosure. In the present example, it is assumed that the artist 600 and the viewer 610 exist in different real spaces, and the viewer 610 visually recognizes the live-action volumetric 600a of the artist 600 displayed on a wall on the real space on the viewer 610 side by the projector 260d (for example, a multi-axis drive projector or the like). Moreover, in the present example, it is assumed that a plurality of large displays 260g and 260h is installed in the real space where the viewer 610 exists. Then, in the present example, the laser point display 620 can be displayed on the large display 260g selected by the artist 600 with the finger-pointing gesture.

6.5 Fifth Example

Figure 25:
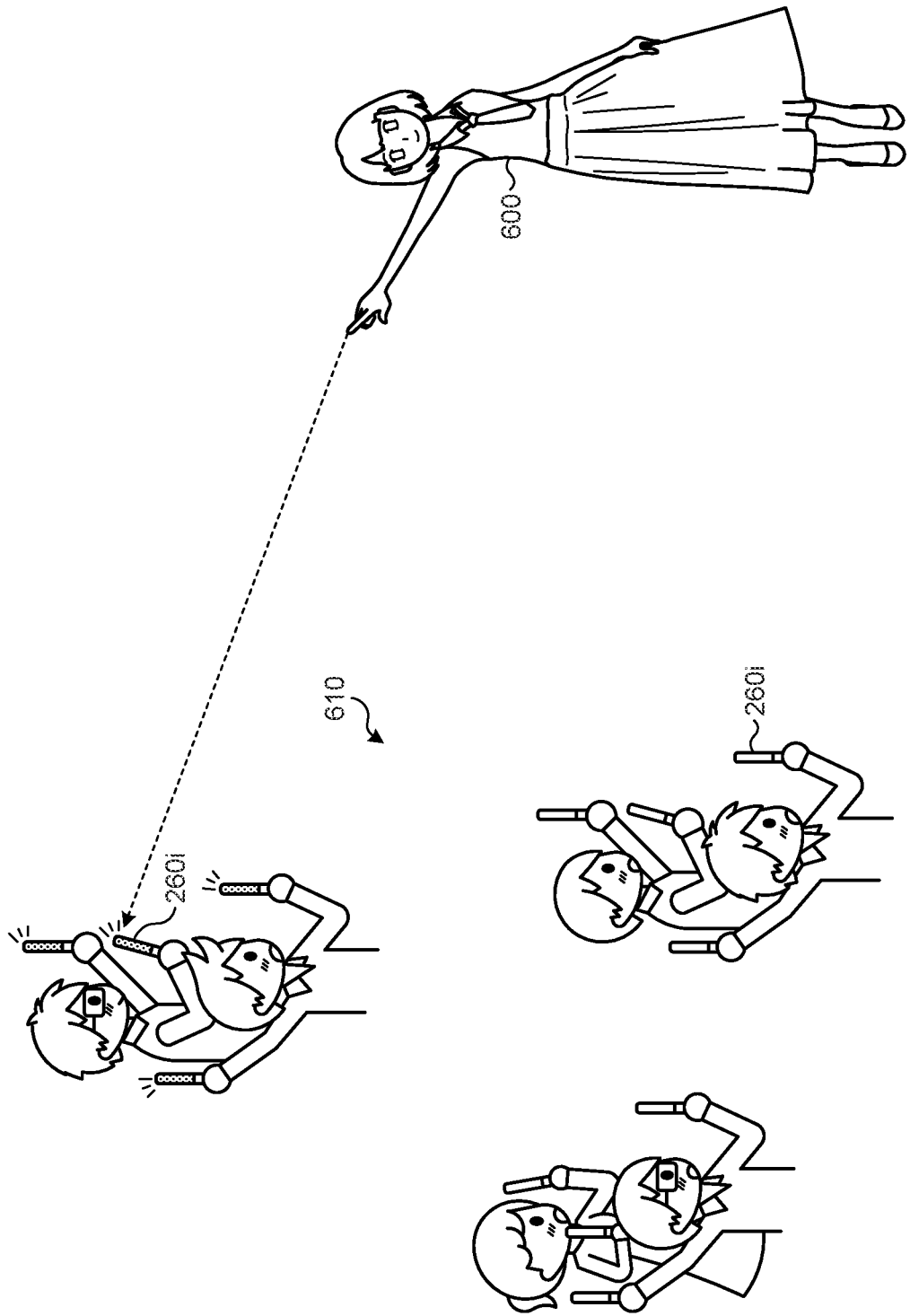
FIG. 25 is an explanatory diagram for explaining a fifth example of the embodiment of the present disclosure.

Next, a fifth example will be described with reference to FIG. 25. The fifth example is an example of AR space sharing, and FIG. 25 is an explanatory diagram for explaining the fifth example of the embodiments of the present disclosure. In the present example, the artist 600 and the viewer 610 exist in the same real space, and FIG. 25 illustrates the real space. Then, in the present example, a cyalume 260i that can communicate with the bidirectional viewing system 1 and is held by the viewer 610 selected by the artist 600 with the finger-pointing gesture is turned on. Note that, in the present example, only the viewer 610 selected by the artist 600 may be illuminated (spotlighted) (in this case, a lighting apparatus that illuminates the viewer 610 can communicate with the bidirectional viewing system 1). Moreover, the present example is not limited to the cyalume 260i, and may be the haptic device 260c or a seat (illustration omitted) on which the viewer 610 sits, and is not particularly limited.

6.6 Sixth Example

Figure 26:
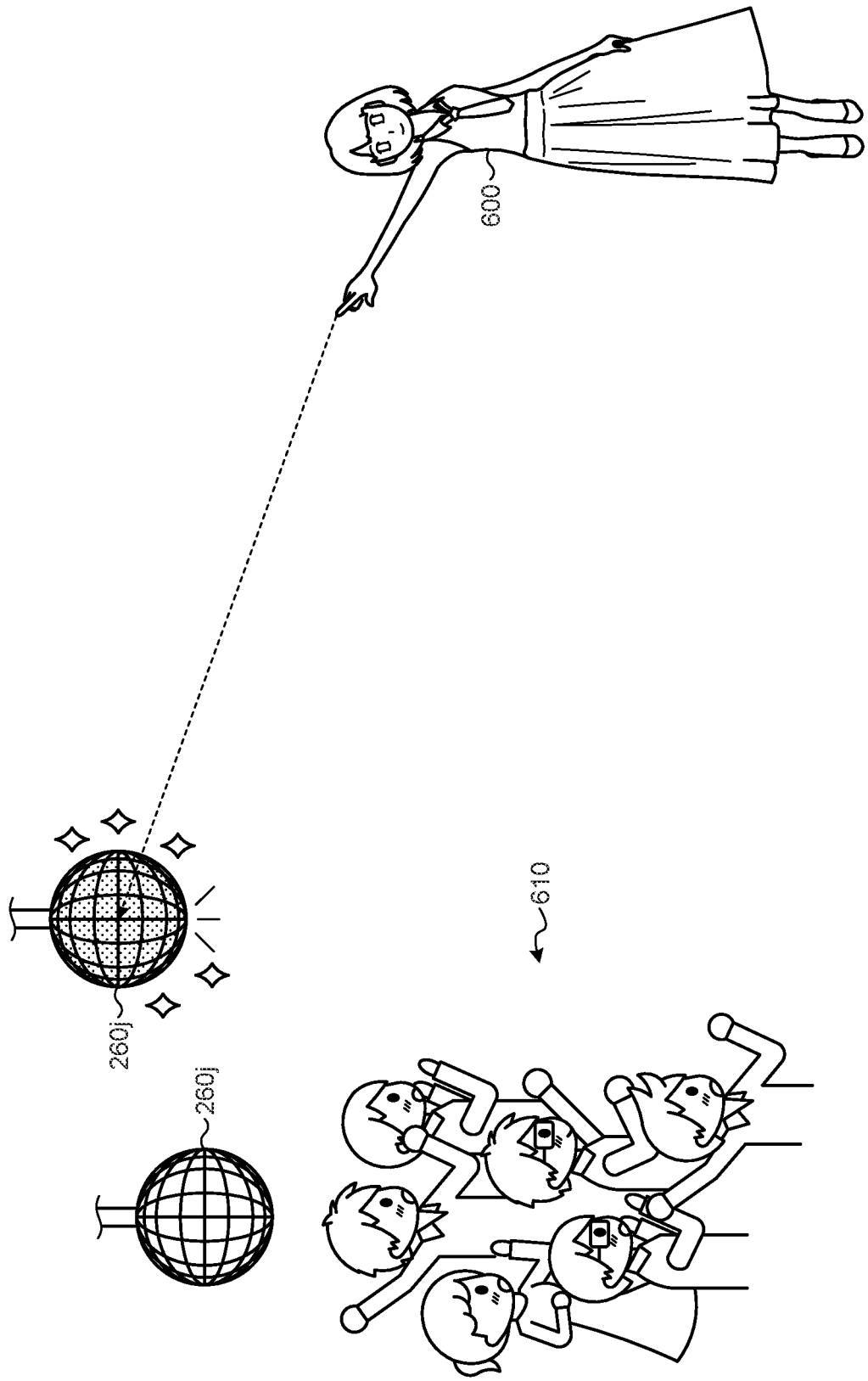
FIG. 26 is an explanatory diagram for explaining a sixth example of the embodiment of the present disclosure.

Next, a sixth example will be described with reference to FIG. 26. The sixth example is an example of AR space sharing, and FIG. 26 is an explanatory diagram for explaining the sixth example of the embodiments of the present disclosure. In the present example, the artist 600 and the viewer 610 exist in the same real space, and FIG. 26 illustrates the real space. Moreover, in the present example, it is assumed that a plurality of lightings 260j capable of communicating with the bidirectional viewing system 1 is installed in the real space. Then, in the present example, the lighting 260j selected by the artist 600 with the finger-pointing gesture is turned on. Note that, the present example is not limited to that the lighting 260j is turned on, but the color and brightness of the light of the selected lighting 260j may be changed.

Note that, in the embodiments of the present disclosure, the person who performs the finger-pointing gesture is not limited to the artist 600, but may be, for example, an athlete (sports event), a teacher (education), an operator (remote control), a doctor (remote medical support), or the like.

6.7 Seventh Example

Figure 27:
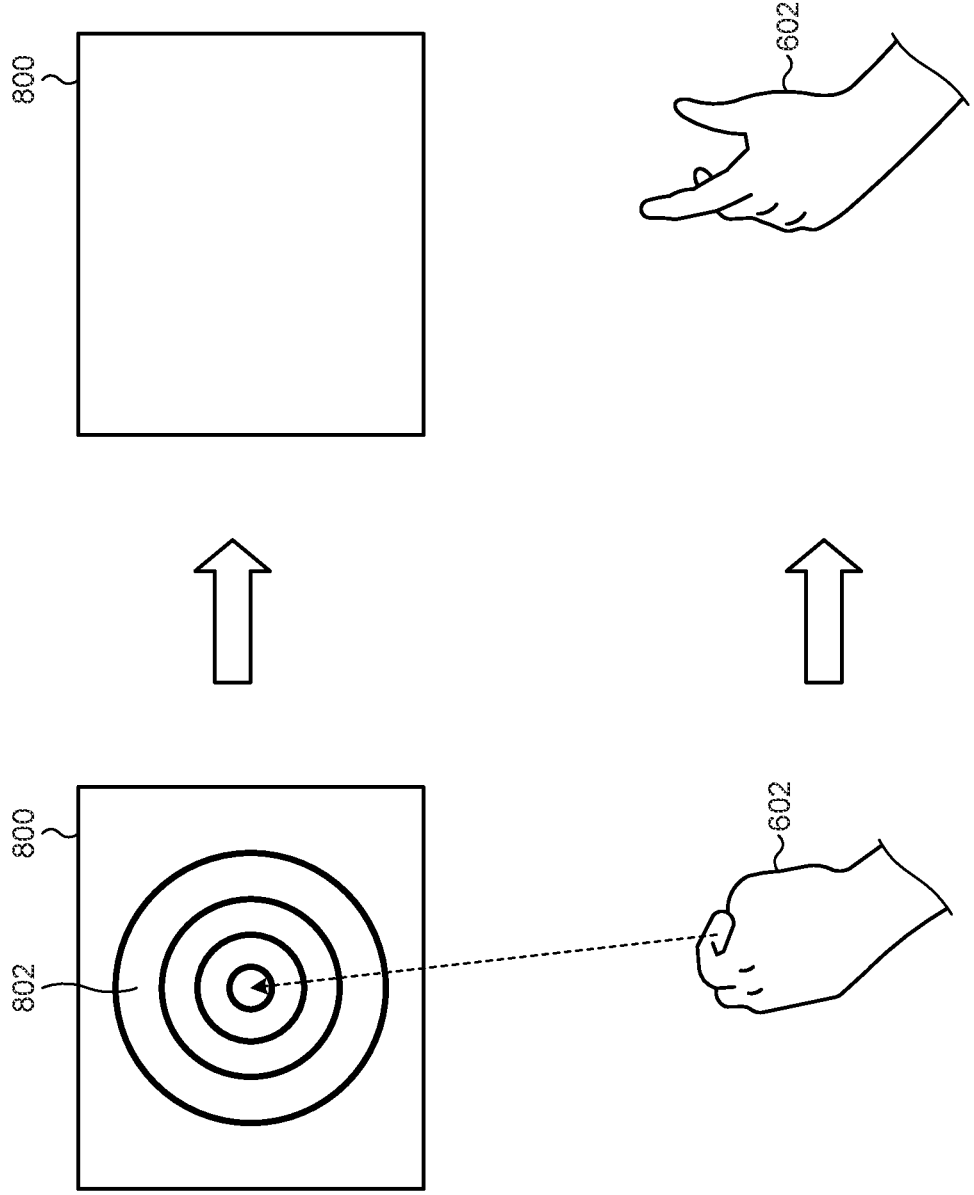
FIG. 27 is an explanatory diagram for explaining a seventh example of the embodiment of the present disclosure.

Next, a seventh example will be described with reference to FIG. 27. The seventh example is an example common to VR space sharing and AR space sharing, and FIG. 27 is an explanatory diagram for explaining the seventh example of the embodiments of the present disclosure. The embodiments of the present disclosure described above can be used, for example, when selecting and operating display in a display 800 (display in a display arranged in a virtual space in the case of VR space sharing). For example, as illustrated in FIG. 27, display 802 in the display 800 can be selected by a gesture (illustrated on the left side of FIG. 27), and a different gesture can be further performed to delete the display 802 (illustrated on the right side of FIG. 27). Note that, in the present example, it is assumed that the detection unit 100a can recognize the gesture of the hand 602 from a captured image of the hand 602, motion data acquired by the IMU or the like, or the like.

6.8 Eighth Example

Figure 28:
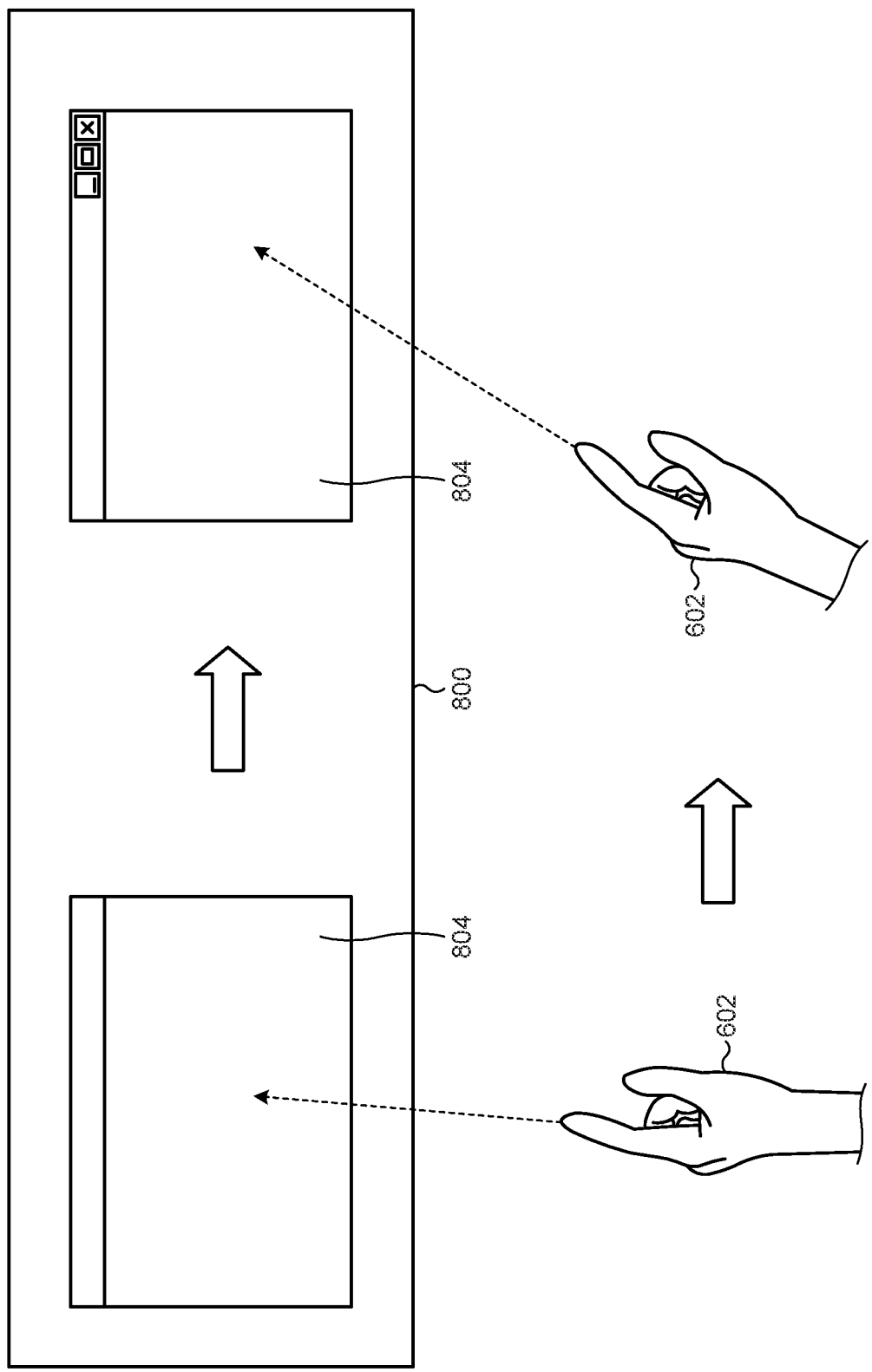
FIG. 28 is an explanatory diagram for explaining an eighth example of the embodiment of the present disclosure.

Next, an eighth example will be described with reference to FIG. 28. The eighth example is an example common to VR space sharing and AR space sharing, and FIG. 28 is an explanatory diagram for explaining the eighth example of the embodiments of the present disclosure. As illustrated in FIG. 28, a window 804 in the display 800 (window in a display arranged in a virtual space in the case of VR space sharing) is selected by the finger-pointing gesture (illustrated on the left side of FIG. 28), and moreover, the position of the window 804 can be moved by moving the pointing direction with the finger-pointing gesture (illustrated on the right side of FIG. 28). Note that, the present example is not limited to the finger-pointing gesture, but various gestures such as a gesture of clenching the hand can be applied.

6.9 Ninth Example

Figure 29:
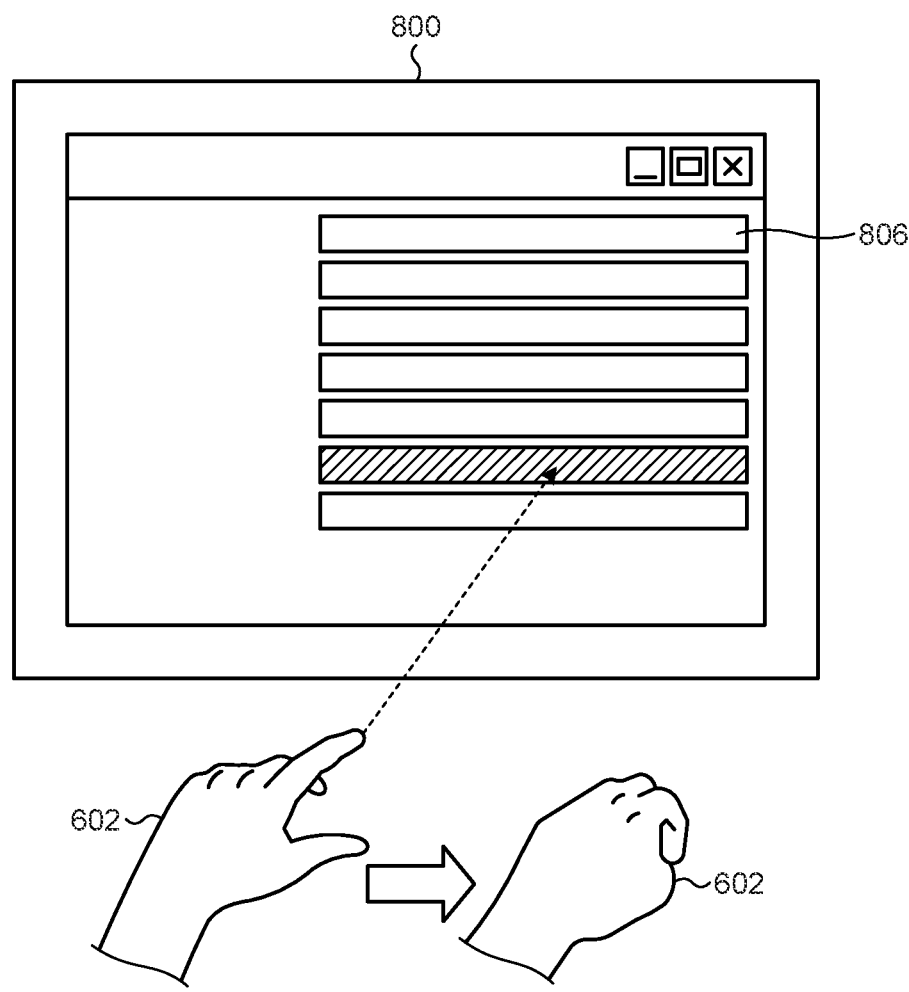
FIG. 29 is an explanatory diagram for explaining a ninth example of the embodiment of the present disclosure.

Next, a ninth example will be described with reference to FIG. 29. The ninth example is an example common to VR space sharing and AR space sharing, and FIG. 29 is an explanatory diagram for explaining the ninth example of the embodiments of the present disclosure. As illustrated in FIG. 29, menu display 806 in the display 800 (menu display in a display arranged in a virtual space in the case of VR space sharing) is selected by a gesture and a different gesture is further performed, so that the selected menu display 806 can be determined. Note that, in the present example, it is assumed that the detection unit 100a can recognize the gesture of the hand 602 from a captured image of the hand 602, motion data acquired by the IMU or the like, or the like.

6.10 Tenth Example

Figure 30:
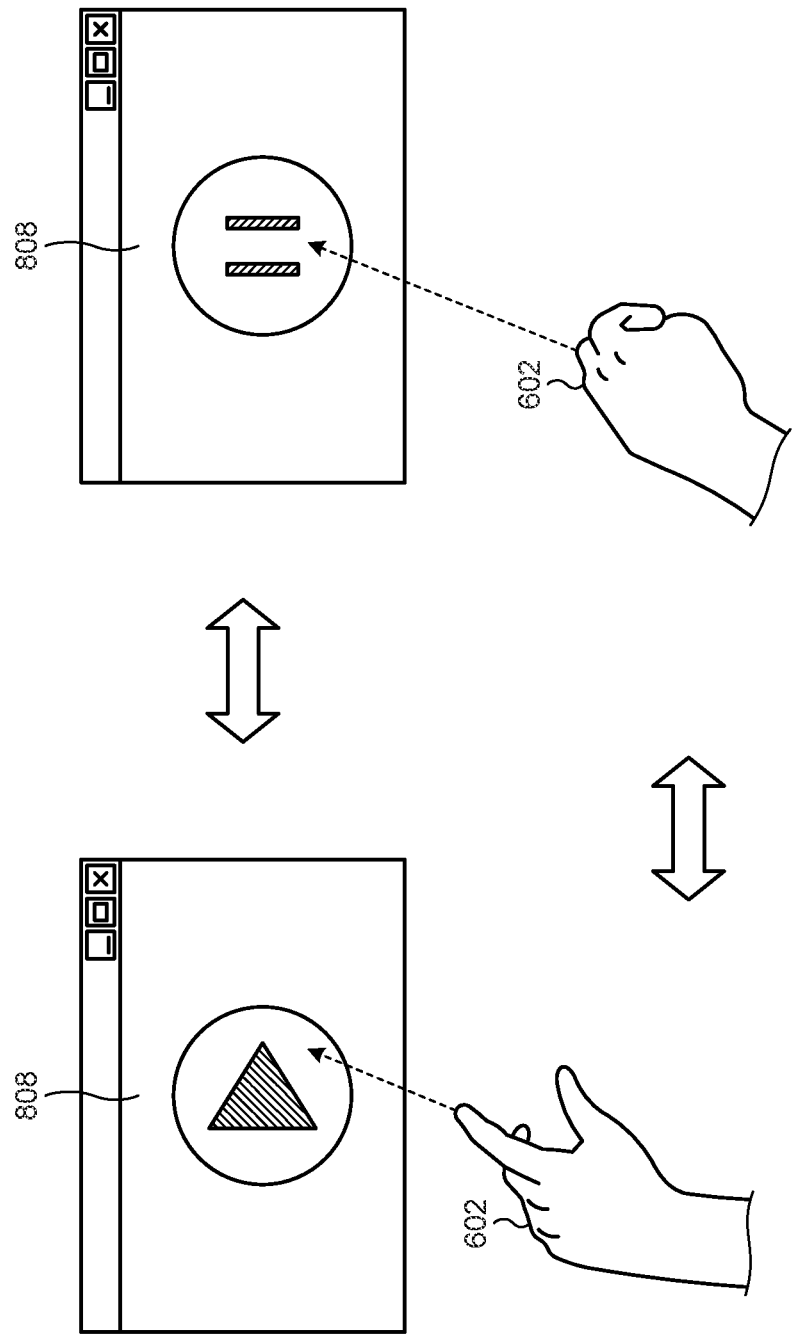
FIG. 30 is an explanatory diagram for explaining a tenth example of the embodiment of the present disclosure.

Moreover, a tenth example will be described with reference to FIG. 30. The tenth example is an example common to VR space sharing and AR space sharing, and FIG. 30 is an explanatory diagram for explaining the tenth example of the embodiments of the present disclosure. As illustrated in FIG. 30, subcontent (for example, moving image, slide show, or the like) 808 (subcontent in a display arranged in a virtual space in the case of VR space sharing) in the display 800 is selected by a gesture (illustrated on the left side of FIG. 30), and a different gesture is further performed, so that the selected subcontent 808 can be stopped (illustrated on the right side of FIG. 30). Note that, in the present example, it is assumed that the detection unit 100a can recognize the gesture of the hand 602 from a captured image of the hand 602, motion data acquired by the IMU or the like, or the like.

7. CONCLUSION

As described above, in the embodiments and modifications of the present disclosure, by detecting the reference point A and the reference point C, the viewer selected by the artist 600 with the finger-pointing gesture can be detected. According to the present embodiments, since the reference point A indicating the position of the wrist of the hand 602 of the artist 600 and the reference point C indicating the position of the base of the arm 604 of the artist 600 corresponding to the finger-pointing gesture can be easily detected by the sensor, the artist 600 who is a distributor can easily select the viewer to point out. Moreover, in the present embodiments, the finger-pointing gesture of performing finger-pointing toward the selected viewer is adopted as the selection motion of the artist 600, and as described above, the finger-pointing gesture is a motion performed to point out an object or the like selected in daily life, and is a natural and intuitive motion, and therefore, there is no burden on the artist 600 (particularly, the arm 604). That is, according to the present embodiments, the viewer selected by a natural and intuitive selection motion by the artist 600 can be accurately selected. As a result, the bidirectional viewing system 1 makes it possible to provide the viewer with an interactive communication experience in which the artist 600 and a specific viewer feel as if they exist in the same space and directly interact with each other, and the viewer can feel a sense of unity with the artist 600.

Note that the embodiments of the present disclosure are not limited to be applied only to events such as music and sports, entertainment, and the like, and can also be applied to remote operation of robots and the like, education, medical support, and the like.

8. REGARDING HARDWARE CONFIGURATION

Figure 31:
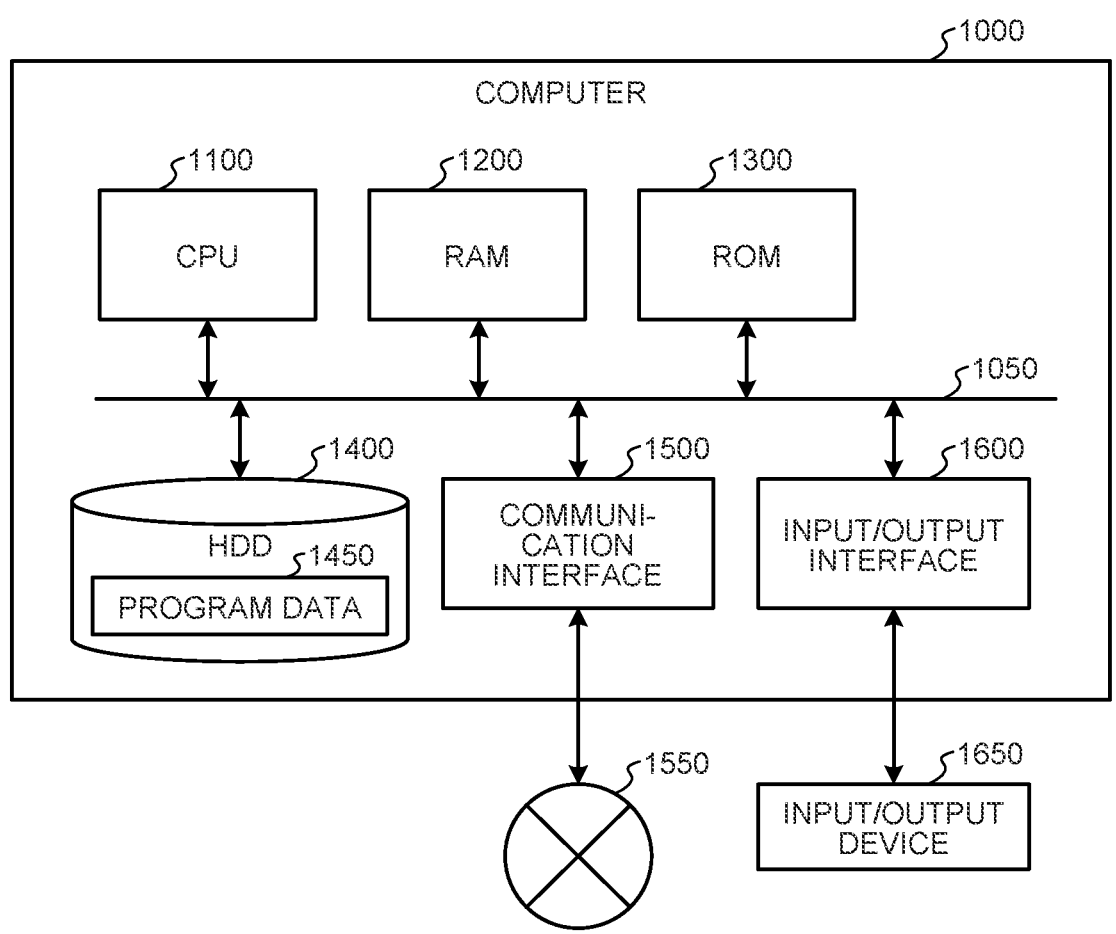
FIG. 31 is a hardware configuration diagram illustrating an example of a computer that implements a function of the distributor-side server 100.

The information processing apparatus such as the distributor-side server 100 or the like according to the above-described embodiments is realized by a computer 1000 having the configuration as illustrated, for example, in FIG. 31. Hereinafter, the distributor-side server 100 according to the embodiments of the present disclosure will be described as an example. FIG. 31 is a hardware configuration diagram illustrating an example of a computer that implements a function of the distributor-side server 100. The computer 1000 includes a CPU 1100, a RAM 1200, a read only memory (ROM) 1300, a hard disk drive (HDD) 1400, a communication interface 1500, and an input/output interface 1600. Each unit of the computer 1000 is connected by a bus 1050.

The CPU 1100 operates on the basis of a program stored in the ROM 1300 or the HDD 1400, and controls each unit. For example, the CPU 1100 loads the program stored in the ROM 1300 or the HDD 1400 to the RAM 1200, and executes processing corresponding to various programs.

The ROM 1300 stores a boot program such as a basic input output system (BIOS) executed by the CPU 1100 when the computer 1000 is activated, a program depending on hardware of the computer 1000, and the like.

The HDD 1400 is a computer-readable recording medium that non-transiently records a program executed by the CPU 1100, data used by the program, and the like. Specifically, the HDD 1400 is a recording medium that records an information processing program according to the present disclosure, which is an example of program data 1450.

The communication interface 1500 is an interface for the computer 1000 to connect to an external network 1550 (for example, the Internet). For example, the CPU 1100 receives data from another device or transmits data generated by the CPU 1100 to another device via the communication interface 1500.

The input/output interface 1600 is an interface for connecting an input/output device 1650 and the computer 1000. For example, the CPU 1100 receives data from an input device such as a keyboard and a mouse via the input/output interface 1600. Further, the CPU 1100 transmits data to an output device such as a display, a speaker, a printer, or the like via the input/output interface 1600. Further, the input/output interface 1600 may function as a media interface that reads a program or the like recorded in a predetermined recording medium. The medium is, for example, an optical recording medium such as a digital versatile disc (DVD), phase change rewritable disk (PD), a magneto-optical recording medium such as a magneto-optical disk (MO), a tape medium, a magnetic recording medium, a semiconductor memory, or the like.

For example, in a case where the computer 1000 functions as the distributor-side server 100 according to the embodiments of the present disclosure, the CPU 1100 of the computer 1000 executes an information processing program loaded on the RAM 1200 to realize the functions of the detection unit 100*a* and the like. Further, the HDD 1400 stores an information processing program or the like according to the embodiments of the present disclosure. Note that the CPU 1100 reads the program data 1450 from the HDD 1400 and executes the program data, but as another example, these programs may be acquired from another apparatus via the external network 1550.

Further, the information processing apparatus according to the present embodiments may be applied to a system including a plurality of apparatuses on the premise of connection to a network (or communication between apparatuses), such as cloud computing. That is, the information processing apparatus according to the present embodiments described above can also be implemented as an information processing system that performs processing related to the information processing method according to the present embodiments, for example, by a plurality of apparatuses.

9. SUPPLEMENT

Further, the embodiments described above can include, for example, a program for causing a computer to function as the information processing apparatus according to the present embodiments, and a non-transitory tangible medium on which the program is recorded. Further, the above-described program may be distributed via a communication line (including wireless communication) such as the Internet.

Moreover, the respective steps in the processing of the above-described embodiments may not necessarily be processed in the described order. For example, the respective steps may be processed in an appropriately changed order. Further, the respective steps may be partially processed in parallel or individually instead of being processed in time series. Moreover, the processing method of the respective steps need not necessarily be processed according to the described method, but may be processed by another method by another functional block.

While the preferred embodiments of the present disclosure have been described in detail above with reference to the accompanying drawings, the technical scope of the present disclosure is not limited to such examples. It will be apparent to those skilled in the art of the present disclosure that various modifications and alterations can be conceived within the scope of the technical idea described in the claims and naturally fall within the technical scope of the present disclosure.

Further, the effects described in the present specification are merely illustrative or exemplary and are not limiting. That is, the technology according to the present disclosure can have other effects apparent to those skilled in the art from the description of the present specification, in addition to or instead of the above-described effects.

Note that the present technology can also have the following configurations.

(1) An information processing apparatus comprising:
a detection unit that detects an object selected by a user with a finger-pointing gesture as a selected object,
wherein
the detection unit detects the selected object on a basis of a first extension line extending from a first line segment connecting a first reference point indicating a position of a wrist of a hand of the user corresponding to the finger-pointing gesture and a second reference point corresponding to a height of the wrist on a first perpendicular line perpendicularly extending from a base of an arm of the user corresponding to the finger-pointing gesture to a floor surface toward a wrist side.

(2) The information processing apparatus according to (1), wherein the detection unit detects the object corresponding to a point on the first extension line as the selected object.

(3) The information processing apparatus according to (1), wherein the detection unit detects the object corresponding to a second perpendicular line perpendicularly extending from a point located on the first extension line to the floor surface as the selected object.

(4) The information processing apparatus according to (1), wherein the detection unit detects the object corresponding to a space having a conical shape having the first extension line as an axis and having the first reference point as a vertex as the selected object.

(5) The information processing apparatus according to any one of (1) to (4), wherein the detection unit detects a plurality of the selected objects.

(6) The information processing apparatus according to (1), wherein a detection mode of the detection unit is switched according to an angle of a corner formed by a second line segment connecting a third reference point indicating a position of a base of an arm of the user corresponding to the finger-pointing gesture and the first reference point and the first perpendicular line on a plane including the second line segment and the first perpendicular line.

(7) The information processing apparatus according to (6), wherein in a case where the angle of the corner is larger than or equal to a first angle and less than or equal to a second angle, the detection unit executes a first detection mode of detecting the selected object on a basis of the first extension line.

(8) The information processing apparatus according to (7), wherein in a case where the angle of the corner is larger than the second angle, the detection unit executes a second detection mode of detecting the selected object on a basis of a second extension line extending from the second line segment toward the wrist side.

(9) The information processing apparatus according to (7) or (8), wherein in a case where the angle of the corner is smaller than the first angle, the detection unit executes a third detection mode of not detecting the selected object.

(10) The information processing apparatus according to any one of (6) to (9), further comprising:

a determination unit that determines whether a pointing action of selecting the selected object by the user with the finger-pointing gesture satisfies a predetermined stability condition, wherein the determination unit determines that the pointing action satisfies the stability condition in a case where the angle of the corner or a distance from a spatial origin to the wrist of the hand of the user corresponding to the finger-pointing gesture is within a predetermined range within a predetermined time, and the detection unit detects the selected object on a basis of a determination result.

(11) The information processing apparatus according to (10), wherein the determination unit acquires a plurality of values of the angle of the corner or the distance, calculates a statistical value on a basis of the acquired values, and determines whether or not the pointing action satisfies the stability condition on a basis of the calculated statistical value.

(12) The information processing apparatus according to any one of (1) to (11), wherein the object is a real object on a real space.

(13) The information processing apparatus according to (12), wherein the real object includes at least one of a human, an animal, a still object, a robot, a lighting, a communication device, and a display.

(14) The information processing apparatus according to (13), further comprising:

a control unit that controls at least one of the robot, the lighting, the communication device, and the display to perform a predetermined operation.

(15) The information processing apparatus according to (12), further comprising:

a display unit that superimposes and displays a predetermined image on the detected selected object.

(16) The information processing apparatus according to any one of (1) to (11), wherein the object is a virtual object on a virtual space.

(17) The information processing apparatus according to any one of (1) to (16), wherein the user and the object are located on a same real space.

(18) The information processing apparatus according to any one of (1) to (16), wherein the user and the object are located on different spaces.

(19) An information processing system comprising:

a detection unit that detects an object selected by a user with a finger-pointing gesture as a selected object;

wherein the detection unit detects the selected object on a basis of a first extension line extending from a first line segment connecting a first reference point indicating a position of a wrist of a hand of the user corresponding to the finger-pointing gesture and a second reference point corresponding to a height of the wrist on a first perpendicular line perpendicularly extending from a base of an arm of the user corresponding to the finger-pointing gesture to a floor surface toward a wrist side.

(20) An information processing method for detecting an object selected by a user with a finger-pointing gesture as a selected object, the method comprising:

detecting, by an information processing apparatus, the selected object on a basis of a first extension line extending from a first line segment connecting a first reference point indicating a position of a wrist of a hand of the user corresponding to the finger-pointing gesture and a second reference point corresponding to a height of the wrist on a first perpendicular line perpendicularly extending from a base of an arm of the user corresponding to the finger-pointing gesture to a floor surface toward a wrist side.

REFERENCE SIGNS LIST

1 BIDIRECTIONAL VIEWING SYSTEM
100 DISTRIBUTOR-SIDE SERVER
100a DETECTION UNIT
102 DISTRIBUTOR-SIDE DATA ACQUISITION UNIT
104 GESTURE RECOGNITION UNIT
106 LASER POINT OUTPUT CONTROL UNIT
108 VIEWER-SIDE DATA ACQUISITION UNIT
110 DETECTION UNIT
112 DETERMINATION UNIT
114 COUNTER OBJECT OUTPUT CONTROL UNIT
116 IMAGE DATA GENERATION UNIT
118 VIDEO STREAMING PROCESSING UNIT
120 BODY POSITION INFORMATION GENERATION UNIT
122 3D MODEL POSITION INFORMATION GENERATION UNIT
124 CONTENT DATA GENERATION UNIT
126 DISTRIBUTION UNIT
130 DISTRIBUTOR-SIDE DATA ACQUISITION APPARATUS
130a MULTI-CAMERA SYSTEM
132 CAMERA
134a IR CAMERA
134b MARKER
136 DEPTH SENSOR
160 DISTRIBUTOR-SIDE OUTPUT APPARATUS
160a DISTRIBUTOR-SIDE DISPLAY UNIT
200 VIEWER-SIDE CLIENT
202 DISTRIBUTION DATA ACQUISITION UNIT
204 CONTENT PROCESSING UNIT
206, 212 TIMING SYNCHRONIZATION UNIT
208 OUTPUT CONTROL UNIT
210 VIEWER-SIDE DATA ACQUISITION UNIT
214 OUTPUT DATA PROCESSING UNIT
216 DISTRIBUTION UNIT
230 VIEWER-SIDE DATA ACQUISITION APPARATUS
260 VIEWER-SIDE OUTPUT APPARATUS
260a HMD
260b VIEWER-SIDE DISPLAY UNIT
260c HAPTIC DEVICE
260d PROJECTOR
260e SPEAKER
260f SMARTPHONE
260g, 260h, 800 DISPLAY
260i CYALUME

260j LIGHTING
300 INTERNET
500, 502 PERPENDICULAR LINE
510, 512 LINE SEGMENT
520, 522 EXTENSION LINE
530 SPACE
600 ARTIST
600a LIVE-ACTION VOLUMETRIC
602 HAND
604 ARM
610a, 610b, 610c, 610d, 610e, 610f VIEWER
612a, 612b, 612c, 612d, 612e AVATAR
620 LASER POINT DISPLAY
700 FLOOR SURFACE
802 DISPLAY
804 WINDOW
806 MENU DISPLAY
808 SUBCONTENT
A, B, C REFERENCE POINT
D DISTANCE
O ORIGIN

The invention claimed is:

1. An information processing apparatus comprising:
a detection unit that detects an object selected by a user with a finger-pointing gesture as a selected object,
wherein
the detection unit detects the selected object on a basis of a first extension line extending from a first line segment connecting a first reference point indicating a position of a wrist of a hand of the user corresponding to the finger-pointing gesture and a second reference point corresponding to a height of the wrist on a first perpendicular line perpendicularly extending from a base of an arm of the user corresponding to the finger-pointing gesture to a floor surface toward a wrist side.

2. The information processing apparatus according to claim 1, wherein the detection unit detects the object corresponding to a point on the first extension line as the selected object.

3. The information processing apparatus according to claim 1, wherein the detection unit detects the object corresponding to a second perpendicular line perpendicularly extending from a point located on the first extension line to the floor surface as the selected object.

4. The information processing apparatus according to claim 1, wherein the detection unit detects the object corresponding to a space having a conical shape having the first extension line as an axis and having the first reference point as a vertex as the selected object.

5. The information processing apparatus according to claim 1, wherein the detection unit detects a plurality of the selected objects.

6. The information processing apparatus according to claim 1, wherein a detection mode of the detection unit is switched according to an angle of a corner formed by a second line segment connecting a third reference point indicating a position of a base of an arm of the user corresponding to the finger-pointing gesture and the first reference point and the first perpendicular line on a plane including the second line segment and the first perpendicular line.

7. The information processing apparatus according to claim 6, wherein in a case where the angle of the corner is larger than or equal to a first angle and less than or equal to a second angle, the detection unit executes a first detection mode of detecting the selected object on a basis of the first extension line.

8. The information processing apparatus according to claim 7, wherein in a case where the angle of the corner is larger than the second angle, the detection unit executes a second detection mode of detecting the selected object on a basis of a second extension line extending from the second line segment toward the wrist side.

9. The information processing apparatus according to claim 7, wherein in a case where the angle of the corner is smaller than the first angle, the detection unit executes a third detection mode of not detecting the selected object.

10. The information processing apparatus according to claim 6, further comprising:
a determination unit that determines whether a pointing action of selecting the selected object by the user with the finger-pointing gesture satisfies a predetermined stability condition,
wherein
the determination unit determines that the pointing action satisfies the stability condition in a case where the angle of the corner or a distance from a spatial origin to the wrist of the hand of the user corresponding to the finger-pointing gesture is within a predetermined range within a predetermined time, and
the detection unit detects the selected object on a basis of a determination result.

11. The information processing apparatus according to claim 10, wherein the determination unit acquires a plurality of values of the angle of the corner or the distance, calculates a statistical value on a basis of the acquired values, and determines whether or not the pointing action satisfies the stability condition on a basis of the calculated statistical value.

12. The information processing apparatus according to claim 1, wherein the object is a real object on a real space.

13. The information processing apparatus according to claim 12, wherein the real object includes at least one of a human, an animal, a still object, a robot, a lighting, a communication device, and a display.

14. The information processing apparatus according to claim 13, further comprising:
a control unit that controls at least one of the robot, the lighting, the communication device, and the display to perform a predetermined operation.

15. The information processing apparatus according to claim 12, further comprising:
a display unit that superimposes and displays a predetermined image on the detected selected object.

16. The information processing apparatus according to claim 1, wherein the object is a virtual object on a virtual space.

17. The information processing apparatus according to claim 1, wherein the user and the object are located on a same real space.

18. The information processing apparatus according to claim 1, wherein the user and the object are located on different spaces.

19. An information processing system comprising:
a detection unit that detects an object selected by a user with a finger-pointing gesture as a selected object;
wherein
the detection unit detects the selected object on a basis of a first extension line extending from a first line segment connecting a first reference point indicating a position of a wrist of a hand of the user corresponding to the finger-pointing gesture and a second reference point corresponding to a height of the wrist on a first perpendicular line perpendicularly extending from a base of an arm of the user corresponding to the finger-pointing gesture to a floor surface toward a wrist side.

20. An information processing method for detecting an object selected by a user with a finger-pointing gesture as a selected object, the method comprising:
    detecting, by an information processing apparatus, the selected object on a basis of a first extension line extending from a first line segment connecting a first reference point indicating a position of a wrist of a hand of the user corresponding to the finger-pointing gesture and a second reference point corresponding to a height of the wrist on a first perpendicular line perpendicularly extending from a base of an arm of the user corresponding to the finger-pointing gesture to a floor surface toward a wrist side.

* * * * *